US012493259B2

(12) United States Patent
Muto

(10) Patent No.: US 12,493,259 B2
(45) Date of Patent: Dec. 9, 2025

(54) PRINT SYSTEM, PRINTING APPARATUS AND METHOD OF CONTROLLING THE PRINTING APPARATUS, AND STORAGE MEDIUM

(71) Applicant: CANON KABUSHIKI KAISHA, Tokyo (JP)

(72) Inventor: Tsuyoshi Muto, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/401,809

(22) Filed: Jan. 2, 2024

(65) Prior Publication Data

US 2024/0241471 A1 Jul. 18, 2024

(30) Foreign Application Priority Data

Jan. 16, 2023 (JP) ................................ 2023-004706

(51) Int. Cl.
*G03G 15/00* (2006.01)

(52) U.S. Cl.
CPC ......... *G03G 15/553* (2013.01); *G03G 15/502* (2013.01); *G03G 15/5095* (2013.01); *G03G 15/607* (2013.01)

(58) Field of Classification Search
CPC ............... G03G 15/553; G03G 15/502; G03G 15/5095; G03G 15/607
See application file for complete search history.

(56) References Cited

U.S. PATENT DOCUMENTS 6,700,675 B1 * 3/2004 Yamamoto ......... H04N 1/00915 358/1.9
6,957,025 B1 * 10/2005 Sinn .................. G03G 15/6508 399/45
2014/0193169 A1 * 7/2014 Shinohara ............. G03G 15/50 399/81

(Continued)

FOREIGN PATENT DOCUMENTS

JP 2009083122 A 4/2009
JP 2010171526 A 8/2010

(Continued)

OTHER PUBLICATIONS

Machine Translation JP 2021-115744 (Year: 2021).*
Japanese Office Action dated Jan. 6, 2025, in related Japanese Patent Application No. 2023-004706.

*Primary Examiner* — David H Banh
(74) *Attorney, Agent, or Firm* — VENABLE LLP

(57) ABSTRACT

A print system prints an image on a sheet according to a print job, stores a reference image in a storage, generates a scanned image by reading a printed sheet, inspects an image on the printed sheet, and detects sheet outage in a paper feeding unit that is a feed source for the print job. In a case the print job is accompanied by inspection, the sheet outage is detected in the paper feeding unit that is the feed source, and the reference image is generated by using print data of the print job, a screen is displayed to select a paper feeding unit that stores sheets whose size matches a sheet size set for the paper feeding unit that is the feed source, regardless of whether a type of the sheets matches a sheet type set for the paper feeding unit that is the feed source.

17 Claims, 15 Drawing Sheets

(56) References Cited

U.S. PATENT DOCUMENTS

| | | | | |
|---|---|---|---|---|
| 2014/0285843 | A1* | 9/2014 | Oonami | G06F 3/1255 358/1.15 |
| 2015/0131116 | A1 | 5/2015 | Sochi | |
| 2018/0056679 | A1* | 3/2018 | Vestjens | B65H 85/00 |
| 2018/0348687 | A1* | 12/2018 | Arai | G03G 15/607 |
| 2022/0011704 | A1* | 1/2022 | Fujimoto | G03G 15/2028 |
| 2022/0185615 | A1 | 6/2022 | Takahashi et al. | |

FOREIGN PATENT DOCUMENTS

| | | | |
|---|---|---|---|
| JP | 2011079323 | A | 4/2011 |
| JP | 2013175880 | A | 9/2013 |
| JP | 2015093411 | A | 5/2015 |
| JP | 2021-115744 | A | 8/2021 |
| JP | 2022092783 | A | 6/2022 |
| JP | 2022183176 | A | 12/2022 |

* cited by examiner

1401

| SHEET No (1402) | REFERENCE IMAGE ID (1403) | SCANNED IMAGE GENERATION (1404) | INSPECTION RESULT (1405) | DISCHARGE (1406) |
|---|---|---|---|---|
| 1000 | 10 | DONE | OK | DONE |
| 1001 | 11 | DONE | NOT DONE | NOT DONE |
| 1002 | 12 | NOT DONE | NOT DONE | NOT DONE |
| 1003 | 13 | NOT DONE | NOT DONE | NOT DONE |
| 1004 | 14 | NOT DONE | NOT DONE | NOT DONE |
| | | | | |
| | | | | |

PRINT SYSTEM, PRINTING APPARATUS AND METHOD OF CONTROLLING THE PRINTING APPARATUS, AND STORAGE MEDIUM

BACKGROUND OF THE INVENTION

Field of the Invention

The present invention relates to a print system, a printing apparatus and a method of controlling the printing apparatus, and a storage medium.

Description of the Related Art

In recent years, print systems in which a printed matter that has been printed by a printing apparatus can be inspected by an inspection apparatus while being conveyed to a discharge tray have been known. In inspection of a printed matter, an inspection apparatus reads an image of the printed matter, which is being conveyed, by scanning and determines whether the printed matter is normal by comparing the scanned image, which has been obtained by reading, and a pre-registered reference image. Such a printed matter may be referred to as a printed sheet or a sheet. By using such an inspection apparatus, it is possible to detect, for example, loss of ruled line, print failure, and color shift.

In inspection of an inspection target printed matter using a reference image obtained by reading a printed sheet on which the reference image has been printed, a scanned image, which has been obtained by reading the inspection target printed matter, and a pre-registered reference image are compared, and thus, it is necessary that printing conditions of the printed sheet on which the reference image has been printed at the time of reference image registration and printing conditions of the inspection target printed matter at the time of inspection match. In cases where these printing conditions do not match, a possibility that it will be determined that images do not match, that is, the inspection result is no good, increases. For example, in cases where an inspection apparatus registers a scanned image, which has been obtained by reading a sheet on which a reference image has been printed, as a reference image, if the type of sheet of an inspection target printed matter and the type of sheet on which the reference image has been printed do not match, the appearance of color of the background portion of an image that has been read from the inspection target printed matter and the appearance of color of the background of the reference image will be different, and thus, it may be determined that the inspection result is no good.

Japanese Patent Laid-Open No. 2021-115744 describes storing, at the time of registering a reference image, sheet information that has been specified in a print job for printing that reference image and, if sheet information that has been specified at the time of executing an inspection job is different from the stored sheet information of the reference image, displaying a screen for confirming whether to execute an inspection process.

Print systems that include an inspection apparatus may enter a paper outage state due to sheets that are stacked on a paper feed tray running out during inspection-accompanied printing. It is known that when the paper outage state is entered, printing is paused, and replenishment of the paper feed tray is prompted or a screen (hereinafter, paper outage screen) for prompting selection of another paper feed tray is displayed. When the paper outage screen is displayed, a user can select a paper feed tray on which sheets of another type are stacked.

In the method according to Japanese Patent Laid-Open No. 2021-115744, it is determined upon reception of an inspection job whether the type of sheet for when a reference image has been registered and the type of sheet of an inspection target printed matter are the same. Therefore, if paper outage occurs during inspection-accompanied printing and an operator selects a paper feed tray on which another type of sheets are stacked, a confirmation screen for confirming whether the type of sheet for when the reference image has been registered and the type of sheet of the inspection target printed matter are the same cannot be displayed. Even if the confirmation screen is displayed, the operator may erroneously start the inspection job in a state that the type of sheet for when the reference image has been registered and the type of sheet of the inspection target printed matter are different from each other.

SUMMARY OF THE INVENTION

Embodiments of the present disclosure eliminate the above-mentioned issues with conventional technology.

A feature of embodiments of the present disclosure is to provide a technique that makes it possible to, when paper outage occurs during an inspection job, prevent an inspection result from becoming no good due to selection of sheets whose sheet type is different from that of sheets that have run out.

According to embodiments of the present disclosure, there is provided a print system comprising: one or more controllers including one or more processors and one or more memories, the one or more controllers configured to: print an image on a sheet according to a print job; store a reference image in a storage; generate a scanned image by reading a printed sheet; inspect an image on the printed sheet based on the generated scanned image and the stored reference image; detect sheet outage in a paper feeding unit that is a feed source for the print job; and in a case that the print job is accompanied by inspection and sheet outage is detected in the paper feeding unit that is the feed source, perform control so as not to allow selection of a paper feeding unit that stores sheets whose sheet information is different from sheet information set for the paper feeding unit that is the feed source.

According to embodiments of the present disclosure, there is provided a print system comprising: one or more controllers including one or more processors and one or more memories, the one or more controllers configured to: print an image on a sheet according to a print job; store a reference image in a storage; generate a scanned image by reading a printed sheet; inspect the printed sheet based on the generated scanned image and the reference image stored in the storage; detect sheet outage in a paper feeding unit that is a feed source for the print job; and allow selection of a paper feeding unit that is different from the paper feeding unit in which sheet outage has been detected; and in a case that the print job is accompanied by inspection and the sheet outage is detected in the paper feeding unit that is the feed source, give a warning in a case where a paper feeding unit that stores sheets whose sheet information is not the same as sheet information set for the paper feeding unit that is the feed source is selected.

According to embodiments of the present disclosure, there is provided a printing apparatus comprising: one or more controllers including one or more processors and one or more memories, the one or more controllers configured to: print an image on a sheet according to a print job; detect sheet outage in a paper feeding unit that is a feed source of the sheet; and in a case that the print job is accompanied by inspection and sheet outage is detected in the paper feeding unit that is the feed source, perform control so as not to allow selection of a paper feeding unit that stores sheets whose sheet information is different from sheet information set for the paper feeding unit that is the feed source.

According to embodiments of the present disclosure, there is provided a printing apparatus comprising: one or more controllers including one or more processors and one or more memories, the one or more controllers configured to: print an image on a sheet according to a print job; detect sheet outage in a paper feeding unit that is a feed source of the sheet; in a case that sheet outage is detected, allow selection of a paper feeding unit that is different from the paper feeding unit; and in a case where the print job is accompanied by inspection and sheet outage is detected in the paper feeding unit that is the feed source, give a warning in a case where a paper feeding unit that stores sheets whose sheet information is not the same as sheet information set for the paper feeding unit that is the feed source is selected.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

DESCRIPTION OF THE EMBODIMENTS

Figure 1:
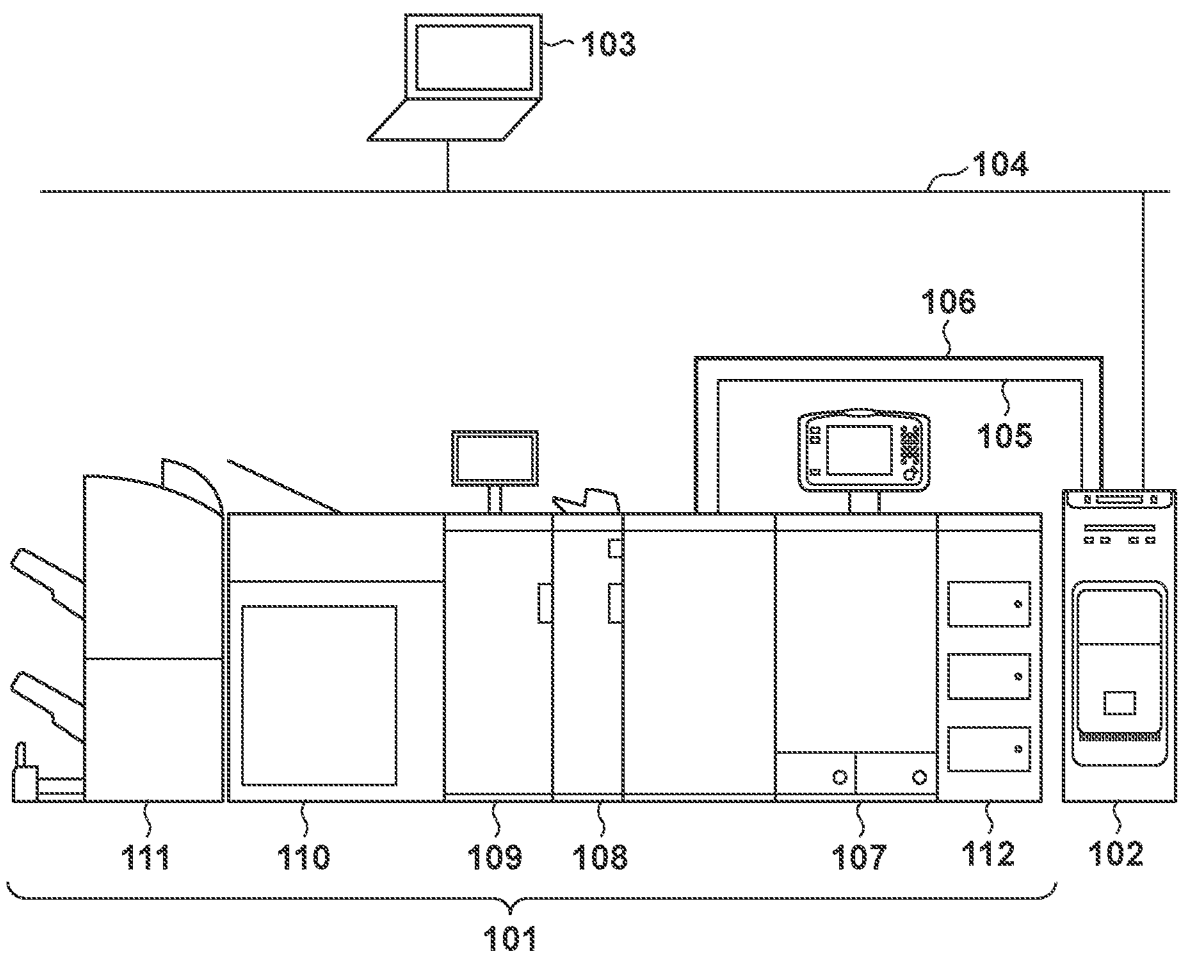
FIG. 1 depicts an overall view of a configuration of an image processing system according to a first embodiment of the present invention.

Embodiments of the present disclosure will be described hereinafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the issues according to the present disclosure. Further, in the accompanying drawings, the same or similar configurations are assigned the same reference numerals, and redundant descriptions are omitted.

An external controller according to one embodiment may be referred to as an outside sourcing controller, an image processing controller, a digital front end (DFE), a print server, and the like. An image forming apparatus may be referred to as a multi-function peripheral (MFP).

FIG. 1 depicts an overall view of a configuration of an image processing system according to a first embodiment of the present invention.

The image processing system includes an image forming apparatus 101 and an external controller 102. The image forming apparatus 101 and the external controller 102 are connected to each other via an internal LAN 105 and a video cable 106 so as to be capable of communication. The external controller 102 is connected with a client PC 103 via an external LAN 104 so as to be capable of communication, and print instructions are issued from the PC 103 to the external controller 102.

A printer driver that includes a function for converting print data into a print description language that can be processed by the external controller 102 is installed on the client PC 103. An operator who instructs printing can issue print instructions from various kinds of applications that are executed on the PC 103 via the printer driver. The printer driver transmits print data to the external controller 102 based on a print instruction from the operator. Upon receiving the print data from the PC 103, the external controller 102 performs analysis of the print data and a rasterizing process of the print data to obtain image data to be printed, inputs the image data to the image forming apparatus 101, and issues a print instruction.

Next, the image forming apparatus 101 will be described.

In the image forming apparatus 101, a plurality of apparatuses that have different functions are connected, and a configuration is taken so as to allow a complicated printing process, such as bookbinding.

A printing apparatus 107 forms (prints) an image on a sheet that is conveyed from a paper feeding unit in the lower portion of the printing apparatus 107, using toner. The sheet may be paper or film and refers to a print sheet on which an image is to be formed using toner. The configuration and the operation principle of the printing apparatus 107 are as follows. A light beam, such as a laser beam, that has been modulated according to image data is reflected by a rotatable polygonal mirror, such as a polygonal mirror, and is emitted, as a scanning light, onto a photosensitive drum. An electrostatic latent image that has been formed on the photosensitive drum by the laser beam is developed using toner, and that toner image is transferred to a sheet that has been adhered to a transfer drum. By executing a series of these image forming processes in order for yellow (Y), magenta (M), cyan (C), and black (K) toners, a full-color image is formed on the sheet. The sheet on which a full-color image has been thus formed is conveyed to a fixing unit. The fixing unit includes a roller, a belt, and the like; incorporates a heat source, such as a halogen heater, in the roller; and fixes the toner to the sheet on which the full-color image has been transferred by melting the toner using heat and pressure.

An inserter 108 is an inserter for inserting an insertion sheet between sheets that have been printed by the printing apparatus 107. The inserter 108 can insert a sheet into a group of sheets that have been printed and conveyed by the printing apparatus 107 at a desired position.

An inspection apparatus 109 is an apparatus for determining whether or not a printed image is normal by reading an image of a conveyed sheet and comparing it with a pre-registered reference image.

A large-volume stacker 110 can stack a large volume of sheets. A finisher 111 is an apparatus for applying a finishing process (post processing) to conveyed sheets. The finishing process is that in which a process, such as stapling, punching, or saddle stitch binding, is performed on sheets on which images have been printed. The sheets on which the finishing process has been performed are discharged to a discharge tray.

A multistage paper feeding unit 112 includes a plurality of paper feeding units for respectively stacking a plurality of types and sizes of sheets or a large number of sheets.

The image processing system that is illustrated in FIG. 1 has a configuration in which the external controller 102 is connected to the image forming apparatus 101; however, the present invention is not limited to the configuration in which the external controller 102 is connected. That is, a configuration may be such that the image forming apparatus 101 is connected to the external LAN 104 and directly receives, from the client PC 103, print data that can be processed by the image forming apparatus 101. In that case, data analysis and rasterizing process of print data and then the printing process are executed in the image forming apparatus 101.

Figure 2:
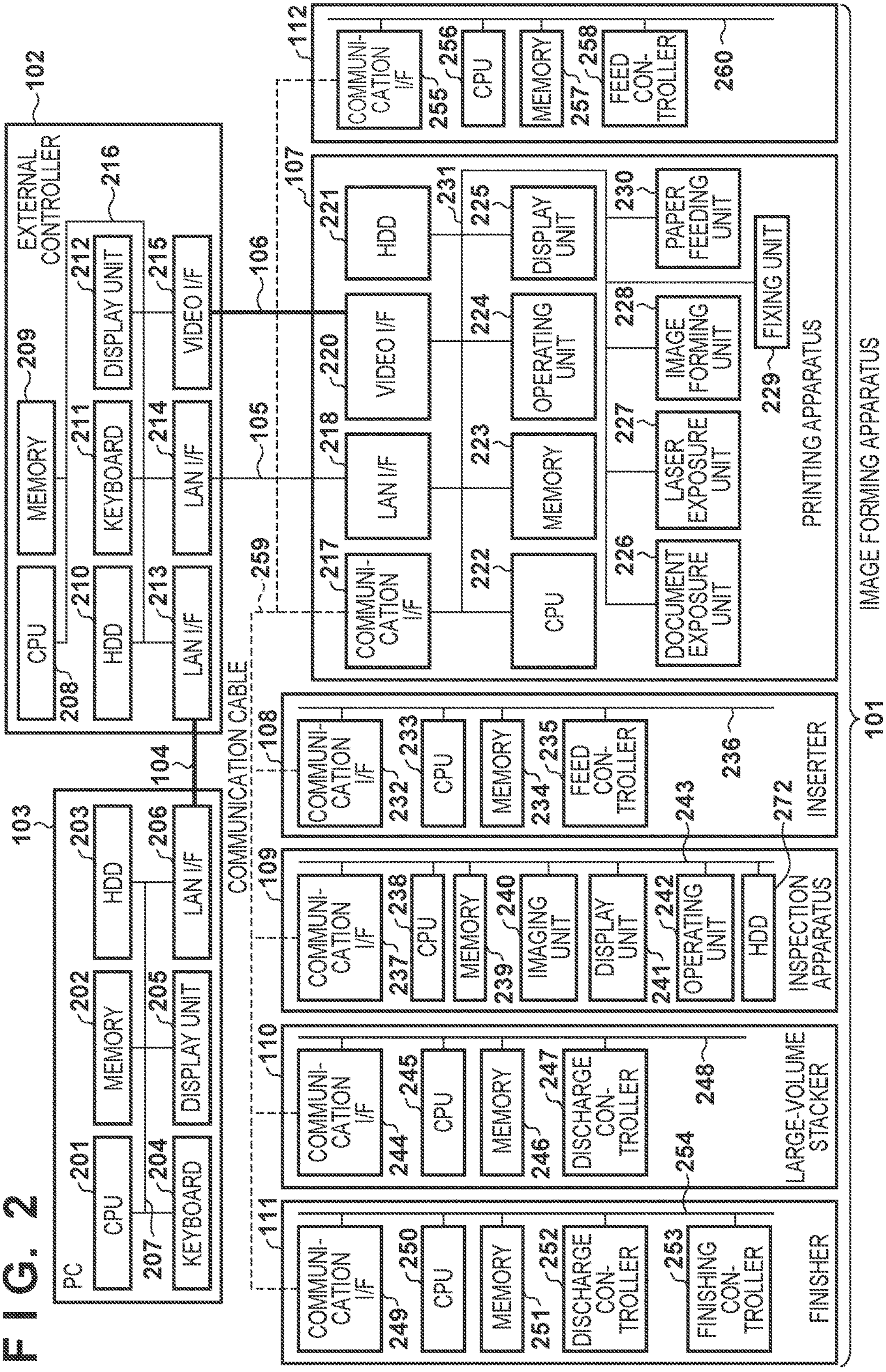
FIG. 2 is a block diagram for describing a hardware configuration of an image forming apparatus, an external controller, and a client PC according to the first embodiment.

FIG. 2 is a block diagram for describing a hardware configuration of the image forming apparatus 101, the external controller 102, and the client PC 103 according to the first embodiment.

First, a configuration of the printing apparatus 107 of the image forming apparatus 101 will be described.

The printing apparatus 107 includes a communication I/F 217, a LAN I/F 218, a video I/F 220, an HDD 221, a CPU 222, a memory 223, an operation unit 224, and a display unit 225. The printing apparatus 107 further includes a document exposure unit 226, a laser exposure unit 227, an image forming unit 228, a fixing unit 229, and a paper feeding unit 230. The respective components are connected via a system bus 231. The communication I/F 217 is connected to the inserter 108, the inspection apparatus 109, the large-volume stacker 110, the finisher 111, and the multistage paper feeding unit 112 via a communication cable 259, and communication for control of respective apparatuses is performed. The LAN I/F 218 is connected to the external controller 102 via the internal LAN 105, and communication of print data and the like is performed. The video I/F 220 is connected to the external controller 102 via the video cable 106, and communication of image data and the like is performed.

The HDD 221 is a storage device for storing programs, data, and the like. The CPU 222 performs comprehensive image processing control and print control by deploying, in the memory 223, the programs stored in the HDD 221 and executing the programs. The memory 223 stores programs that are necessary for when the CPU 222 performs various kinds of processes as well as image data and operates as a work area. The operation unit 224 accepts, from the operator, input of various kinds of settings and instructions for operation. The display unit 225 displays setting information of the image forming apparatus 101, a print job processing status, and the like.

The document exposure unit 226 performs a process of reading a document when a copy function or a scan function is used. Document data is read by a CCD camera capturing an image while an exposure lamp illuminates a document that has been placed by the operator or conveyed by an auto document feeder (ADF). The laser exposure unit 227 is a device that performs primary charging and laser exposure for emitting a laser beam onto the photosensitive drum to transfer a toner image. In the laser exposure unit 227, primary charging in which the surface of the photosensitive drum is charged to a uniform negative potential is first performed. Next, a laser driver emits a laser beam onto the photosensitive drum while adjusting the reflection angle with the polygonal mirror. This neutralizes the negative charge of the irradiated portion, and an electrostatic latent image is thus formed. The image forming unit 228 is a device for transferring toner to a sheet; includes a developing unit, a transfer unit, a toner replenishing unit, and the like; and transfers toner that is on the photosensitive drum to a sheet. In the developing unit, an electrostatic latent image on the surface of the photosensitive drum is visualized by the negatively charged toner being adhered from a developing cylinder to the electrostatic latent image. In the transfer unit, primary transfer in which toner that is on the surface of the photosensitive drum is transferred to a transfer belt by a positive potential being applied to a primary transfer roller and secondary transfer in which toner that is on the transfer belt is transferred to a sheet by a positive potential being applied to a second transfer roller are performed. The fixing unit 229 is a device for melting and fixing toner that is on a sheet to the sheet with heat and pressure and includes a heater, a fixing belt, a pressure belt, and the like. The paper feeding unit 230 is a device for feeding sheets, and a feeding operation and a conveyance operation of sheets are controlled by rollers and various kinds of sensors.

Next, a configuration of the inserter 108 of the image forming apparatus 101 will be described.

The inserter 108 includes a communication I/F 232, a CPU 233, a memory 234, and a feed controller 235, and the respective components are connected via a system bus 236. The communication I/F 232 is connected to the printing apparatus 107 via the communication cable 259, and communication that is necessary for control is performed. The CPU 233 performs various kinds of control that are necessary for feeding according to a control program that is stored in the memory 234. The memory 234 is a storage unit in which the control program and the like are stored. The feed controller 235 controls feeding and conveyance of sheets that have been conveyed from the printing apparatus 107 or a paper feeding unit of the inserter while controlling rollers and sensors based on instructions from the CPU 233.

Next, a configuration of the inspection apparatus 109 of the image forming apparatus 101 will be described.

The inspection apparatus 109 includes a communication I/F 237, a CPU 238, a memory 239, an imaging unit 240, a display unit 241, an operation unit 242, and an HDD 272, and the respective components are connected via a system bus 243. The communication I/F 237 is connected to the printing apparatus 107 via the communication cable 259, and communication that is necessary for control is performed. The CPU 238 performs various kinds of control that are necessary for inspection according to a control program that is stored in the memory 239. The memory 239 is a storage unit in which the control program and the like are stored and includes a work area for storing various kind of data to be used by the CPU 238 when performing various kinds of processing.

The imaging unit 240 generates a scanned image by capturing an image of a conveyed sheet based on an instruction of the CPU 238. The CPU 238 determines whether or not a printed image is normal by comparing the scanned image that has been generated by the imaging unit 240 with a reference image that is stored in the HDD 272. The display unit 241 displays an inspection result, a setting screen, and the like. The operation unit 242 is operated by the operator and accepts instructions, such as change of settings of the inspection apparatus 109 or registration of reference images. The HDD 272 stores reference images and the like. If the inspection apparatus 109 does not include the HDD 272, reference images are stored in the HDD 221 of the printing apparatus 107. A configuration may be taken so as to then, when executing an inspection process, receive, from the printing apparatus 107, and store, in the memory 239, the reference images that are stored in the HDD 221 of the printing apparatus 107 to use the reference images.

Next, a configuration of the large-volume stacker 110 of the image forming apparatus 101 will be described.

The large-volume stacker 110 includes a communication I/F 244, a CPU 245, a memory 246, and a discharge controller 247, and the respective components are connected via a system bus 248. The communication I/F 244 is connected to the printing apparatus 107 via the communication cable 259, and communication that is necessary for control is performed. The CPU 245 performs various kinds of control that are necessary for discharging according to a control program that is stored in the memory 246. The memory 246 is a storage unit in which the control program and the like are stored. The discharge controller 247 performs control for conveying conveyed sheets to a stack tray, an escape tray, or the subsequent finisher 111 based on instructions from the CPU 245.

Next, a configuration of the finisher 111 of the image forming apparatus 101 will be described.

The finisher 111 includes a communication I/F 249, a CPU 250, a memory 251, and a discharge controller 252 and a finishing controller 253, and the respective components are connected via a system bus 254. The communication I/F 249 is connected to the printing apparatus 107 via the communication cable 259, and communication that is necessary for control is performed. The CPU 250 performs various kinds of control that are necessary for finishing and discharging according to a control program that is stored in the memory 251. The memory 251 is a storage unit in which the control program and the like are stored. The discharge controller 252 controls conveyance and discharging of sheets based on instructions from the CPU 250. The finishing controller 253 controls a finishing process, such as stapling, punching, or saddle stitch binding, based on instructions of the CPU 250. The finishing process need not include all finishing processes, such as stapling, punching, and saddle stitch binding.

Next, a configuration of the multistage paper feeding unit 112 of the image forming apparatus 101 will be described.

The multistage paper feeding unit 112 includes a communication I/F 255, a CPU 256, a memory 257, and a feed controller 258, and the respective components are connected via a system bus 260. The communication I/F 255 is connected to the printing apparatus 107 via the communication cable 259, and communication that is necessary for control is performed. The CPU 256 performs various kinds of control that are necessary for feeding according to a control program that is stored in the memory 257. The memory 257 is a storage unit in which the control program and the like are stored. The feed controller 258 controls feeding and conveyance of sheets from paper feed decks of the multistage paper feeding unit 112 while controlling rollers and sensors based on instructions from the CPU 256.

Next, a configuration of the external controller 102 will be described.

The external controller 102 includes a CPU 208, a memory 209, an HDD 210, a keyboard 211, a display unit 212, a LAN I/F 213, a LAN I/F 214, and a video I/F 215, and these are connected via a system bus 216. The CPU 208 comprehensively executes processes, such as reception of print data from the client PC 103, the RIP process, and transmission of image data to the image forming apparatus 101 by deploying, in the memory 209, programs that are stored in the HDD 210. The memory 209 stores programs and data that are necessary for when the CPU 208 performs various kinds of processes and operates as a work area. The HDD 210 stores programs, data, and the like that are necessary for operation, such as a printing process. The keyboard 211 is operated by a user and is used for inputting operation instructions for the external controller 102. The display unit 212 displays information, such as an execution application of the external controller 102, according to still or moving image video signals. The LAN I/F 213 is connected to the client PC 103 via the external LAN 104, and communication of print instructions and the like is performed. The LAN I/F 214 is connected to the image forming apparatus 101 via the internal LAN 105, and communication of print instructions and the like is performed. The video I/F 215 is connected to the image forming apparatus 101 via the video cable 106, and communication of image data and the like is performed.

Last, a configuration of the client PC 103 will be described.

The client PC 103 includes a CPU 201, a memory 202, an HDD 203, a keyboard 204, a display unit 205, and a LAN I/F 206, and these are connected via a system bus 207. The CPU 201 generates print data and executes print instructions by deploying, in the memory 202, a document processing program and the like that are stored in the HDD 203 and executing the document processing program and the like. The CPU 201 performs comprehensive control of respective devices that are connected to the system bus 207. The memory 202 stores programs, data, and the like that are necessary for when the CPU 201 performs various kinds of processes and operates as a work area. The HDD 203 stores programs and data that are necessary for operation, such as the printing process. The keyboard 204 is a device for the user to input operation instructions for the PC 103. The display unit 205 displays information, such as an execution application of the client PC 103, according to still or moving image video signals. The LAN I/F 206 is connected to the external LAN 104, and communication of print instructions, print data and the like is performed.

In the above description, the external controller 102 and the image forming apparatus 101 are connected via the internal LAN 105 and the video cable 106 but need only be configured so as to be able to transmit and receive various kind of data that is necessary for printing and may be connected only via the video cable, for example. The memories 202, 209, 223, 234, 239, 246, and 251 may each be a storage unit for holding data and programs. For example, a configuration in which they have been substituted with a volatile RAM, a non-volatile ROM, an internal HDD, an external HDD, a USB memory, or the like may be taken.

Figure 3:
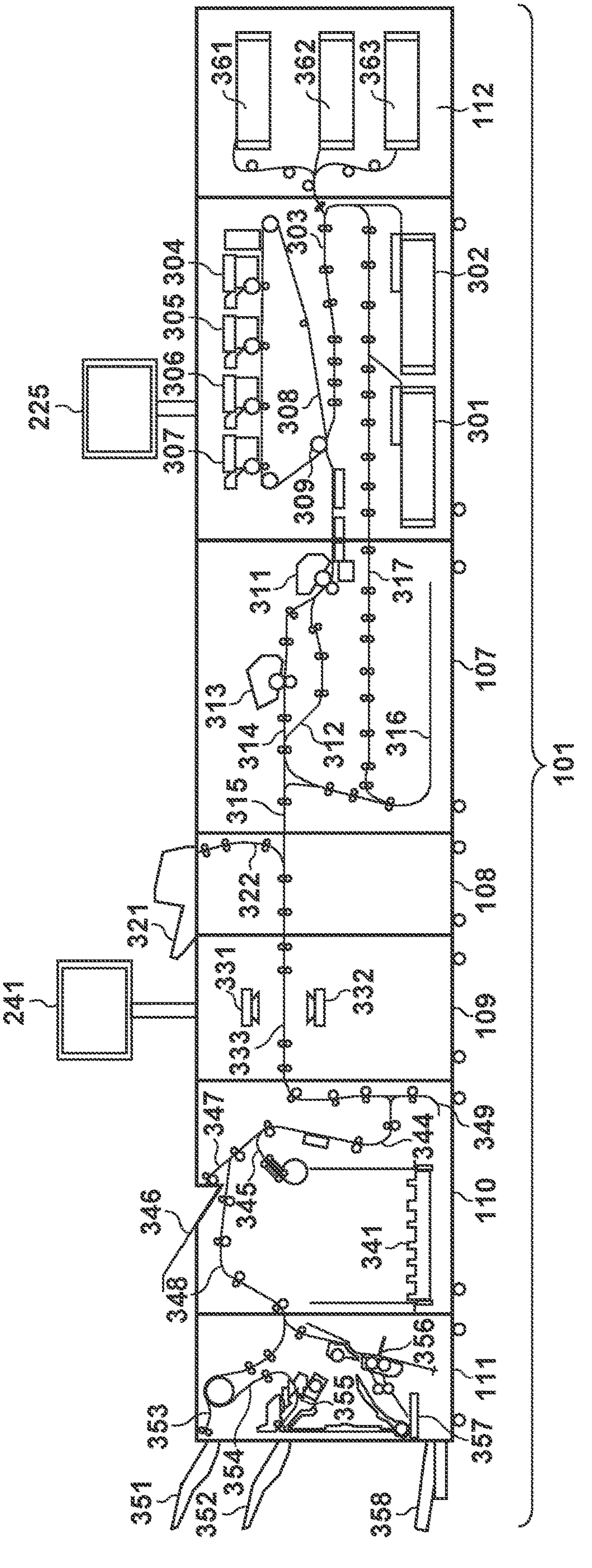
FIG. 3 depicts a simplified cross-sectional view illustrating a mechanism of the image forming apparatus according to the first embodiment.

FIG. 3 depicts a simplified cross-sectional view illustrating a mechanism of the image forming apparatus 101 according to the first embodiment.

The printing apparatus 107 includes paper feed decks 301 and 302 as the paper feeding unit 230, and respective types of sheets are stored in the respective paper feed decks. The information (sheet size and sheet type) of sheets that are stacked in the respective paper feed decks can be set from the operation unit 224 of the printing apparatus 107. In each paper feed deck, it is possible to separate only the uppermost sheet from the stored sheets and convey the sheet to a sheet conveyance path 303.

Developing stations 304 to 307 each form a toner image using Y, M, C, or K colored toner to form a color image. The toner images that have been formed here are superimposed and primarily transferred to an intermediate transfer belt 308. The intermediate transfer belt 308 rotates in a clockwise direction in FIG. 3, and the superimposed toner images are transferred at a secondary transfer position 309 to a sheet that has been conveyed through the sheet conveyance path 303.

The display unit 225 displays the printing status of the image forming apparatus 101 and information for settings. A fixing unit 311 fixes the superimposed toner images to the sheet to obtain the sheet on which a full color image has been printed. The fixing unit 311 includes a pressing roller and a heating roller and, by the sheet passing between the rollers, melts and presses toner and thus fixes the toner images to the sheet. Upon having passed the fixing unit 311, the sheet is conveyed to a conveyance path 315 via a sheet conveyance path 312. When further melting and pressing is necessary for fixing due to the type of sheet, the sheet, after having passed the fixing unit 311, is conveyed to a second fixing unit 313 using an upper sheet conveyance path and, after being subjected to additional melting and pressing, is conveyed to the conveyance path 315 via a sheet conveyance path 314. When image forming mode is two-sided, the sheet on which printing has been performed on one side is conveyed to a sheet reversing path 316 and, after being reversed in the sheet reversing path 316, is conveyed to a two-sided conveyance path 317, and the image of the second side is transferred at the secondary transfer position 309.

The inserter 108 includes an inserter tray 321 on which one or more insertion sheets are stacked and causes an insertion sheet that has been fed through a sheet conveyance path 322 to join the conveyance path. This makes it possible to insert the insertion sheet at a desired position into a series of sheets that are conveyed from the printing apparatus 107 and convey the sheets in which the insertion sheet is inserted to a subsequent apparatus.

Upon having passed through the inserter 108, each sheet is conveyed to the inspection apparatus 109. Cameras 331 and 332 are disposed in the inspection apparatus 109 in an opposing manner. The camera 331 is a camera for reading the upper surface of the sheet, and the camera 332 is for reading the lower surface of the sheet. The inspection apparatus 109 can read images of a sheet that has been conveyed to a sheet conveyance path 333 using the cameras 331 and 332 at a timing at which the sheet reaches a predetermined position and determine whether or not the images of the sheet are normal. The display unit 241 displays, for example, results of inspection that has been performed by the inspection apparatus 109. The cameras 331 and 332 correspond to the imaging unit 240 of FIG. 2.

The large-volume stacker 110 includes a stack tray 341 as a tray for stacking sheets. Upon having passed through the inspection apparatus 109, the sheets are inputted to the large-volume stacker 110 via a sheet conveyance path 344. Then, the sheets are stacked on the stack tray 341 from the sheet conveyance path 344 via a sheet conveyance path 345. The large-volume stacker 110 further includes an escape tray 346 as a discharge tray. The escape tray 346 is a discharge tray that is used to discharge a sheet that has been determined to be a defect sheet by the inspection apparatus 109. When outputting the defect sheet to the escape tray 346, the defect sheet is conveyed from the sheet conveyance path 344 to the escape tray 346 via a sheet conveyance path 347. When conveying a sheet to the finisher (post-processing apparatus) 111, which is downstream of the large-volume stacker 110, the sheet is conveyed via a sheet conveyance path 348.

As described above, if the inspection apparatus 109 determines that a sheet is a defect sheet, printing is interrupted, and sheets that are subsequent to the defect sheet and have already been fed are discharged to a discharge destination that is different from that of normal sheets. This makes it possible to prevent the defect sheet from being mixed into normal sheets. After a defect sheet has been detected, by printing being resumed from that sheet on which a defect occurred, printing is continued from the sheet on which a defect occurred. A reversing unit 349 reverses sheets. The reversing unit 349 is used when stacking a sheet on the stack tray 341. When stacking a sheet on the stack tray 341 such that the direction of the inputted sheet is the same as the direction of the sheet at the time of output, the sheet is reversed once by the reversing unit 349. When conveying a sheet to the escape tray 346 or the subsequent finisher 111, the sheet is discharged as is without being flipped at the time of being stacked, and so, no reversing operation is performed in the reversing unit 349.

The finisher 111 performs a finishing process to conveyed sheets according to a function that has been designated by the operator. Specifically, the finisher 111 includes a finishing function, such as stapling (e.g., one-point and two-point stapling), punching (e.g., two-hole and three-hole), and saddle stitch binding. The finisher 111 does not need to include all the functions of stapling, punching, and saddle stitch binding. The finisher 111 includes two discharge trays 351 and 352, and when a finishing process, such as stapling, is not performed, a sheet bundle is outputted to a discharge tray 351 via a sheet conveyance path 353. Meanwhile, when performing a finishing process, such as stapling, sheets pass through a sheet conveyance path 354 and a finishing function that has been designated by the operator is executed in a processing unit 355 and then a bundle of the sheets is outputted to the discharge tray 352. The discharge trays 351 and 352 can each be raised and lowered, and an operation can be performed so as to lower the discharge tray 351 and stack, on the discharge tray 351, a bundle of sheets on which a finishing process has been performed by the processing unit 355. When saddle stitch binding is designated, a stapling process is performed in the middle of each sheet in a saddle stitching processing unit 356, and the sheets are then folded in two and outputted to a saddle stitch binding tray 358 via a sheet conveyance path 357. The saddle stitch binding tray 358 has a conveyor-belt configuration and is configured such that a saddle stitch bookbinding bundle that has been stacked on the saddle stitch binding tray 358 is conveyed to the left in FIG. 3.

The multistage paper feeding unit 112 includes a plurality of paper feeding units. In the multistage paper feeding unit 112, paper feed decks 361, 362 and 363 can store various kinds of sheets. The information (sheet size and sheet type) of sheets that are stored in the respective paper feed decks can be set from the operation unit 224 of the printing apparatus 107. In each paper feed deck, it is possible to separate only the uppermost sheet from the stored sheets and convey the sheet to the sheet conveyance path 303.

Figure 4:
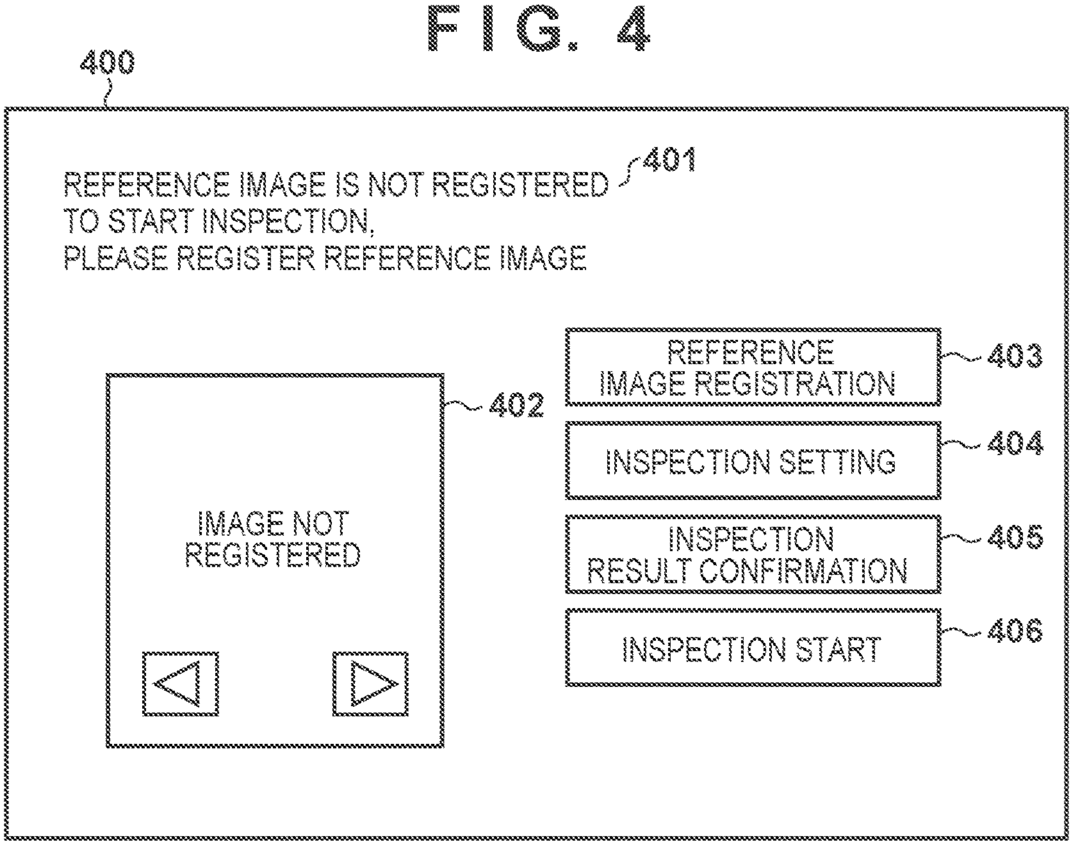
FIG. 4 depicts a view illustrating an example of a screen to be displayed on a display unit at the time of startup of an inspection apparatus according to the first embodiment.
Figure 5:
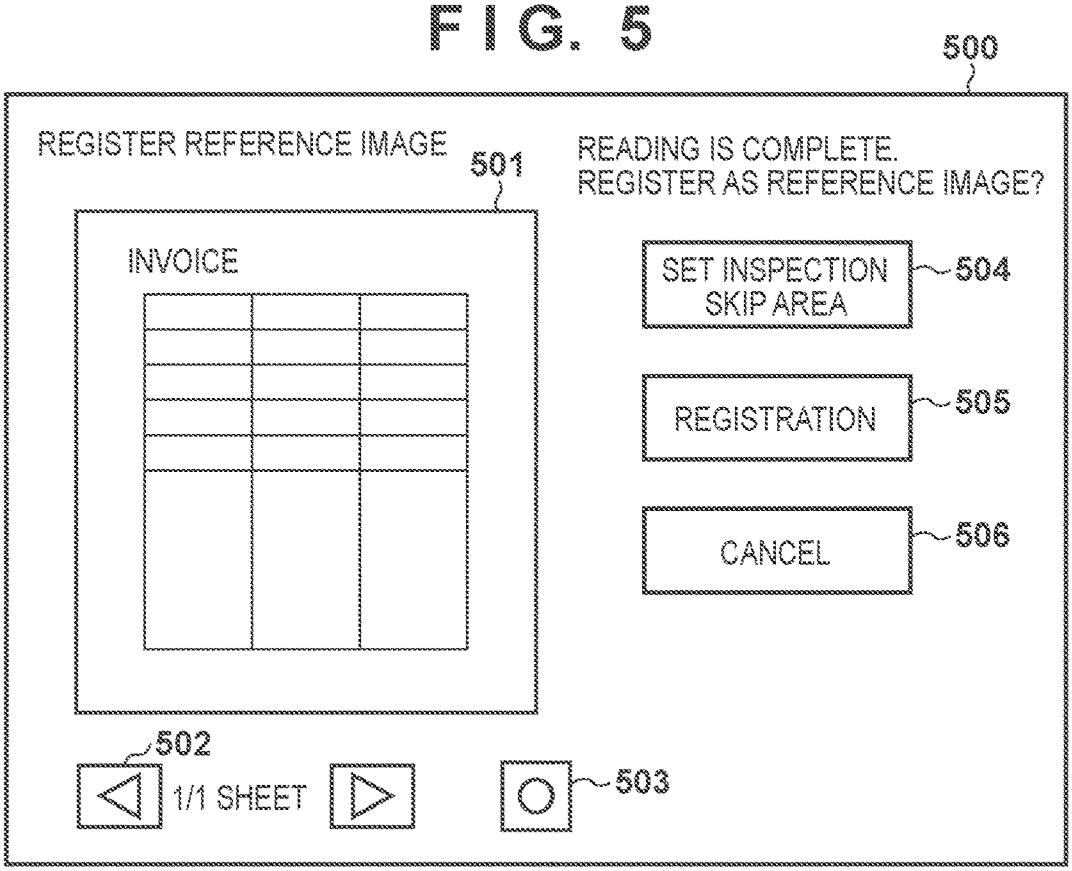
FIG. 5 depicts a view illustrating an example of a reference image registration screen to be displayed on the display unit after a reference image registration button has been pressed and reference image reading has been completed in the inspection apparatus according to the first embodiment.
Figure 6:
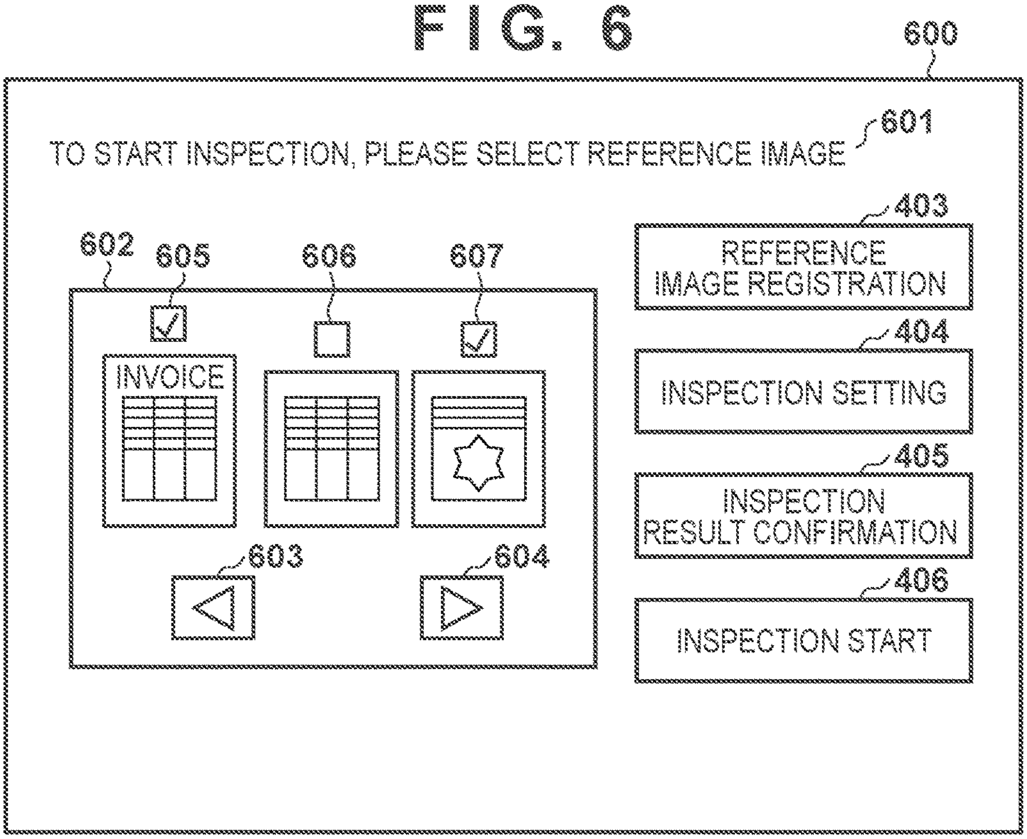
FIG. 6 depicts a view illustrating an example of a home screen to be displayed on the display unit when an inspection start button is pressed after a plurality of reference images have been registered in the inspection apparatus according to the first embodiment.

FIGS. 4 to 6 depict views respectively illustrating examples of screens to be displayed on the display unit 241 of the inspection apparatus 109 according to the first embodiment. These screens are displayed based on instructions from the CPU 238 of the inspection apparatus 109. The inspection apparatus 109 inspects an image of a conveyed sheet (printed matter) according to preset inspection items. An image of a sheet is inspected by comparing a pre-registered reference image and a scanned image, which has been obtained by reading a conveyed sheet. Methods of comparing images includes a method of comparing pixel values for each image position, a method of comparing positions of objects by edge detection, and a method of extracting character data by optical character recognition (OCR), for example. The inspection items include shift in printing position, color tone of the image, density of the image, streaks and fading, and print dropouts, for example. It is not necessary to perform inspection for all the inspection items, and it is possible to select one or more items.

FIG. 4 depicts a view illustrating an example of a screen 400 to be displayed on the display unit 241 of the inspection apparatus 109 at the time of startup of the inspection apparatus 109 according to the first embodiment.

A message 401 indicates that a reference image is not registered, and to start inspection, the reference image needs to be registered. Registered reference image will be displayed in an area 402. In the screen 400 of FIG. 4, as one example, since reference image is not registered, no image is displayed in the area 402, and the message 401 indicating that reference image is not registered is displayed. The display for when a reference image is registered will be described later.

A reference image registration button 403 is a button for calling a reference image registration screen. A reference image is an image to be compared with a scanned image, which has been obtained by reading an inspection target sheet in the inspection apparatus 109, and an image (reference image) that has been obtained by reading a sheet that has been determined in advance by visual observation or the inspection apparatus 109 to have been normally printed is used. An inspection setting button 404 is a button for calling an inspection setting screen. Inspection items and inspection precision (at what degree of difference from the reference image, an image is to be determined a defect image) are set according to inspection purposes of the operator. An inspection result confirmation button 405 is a button for calling an inspection result confirmation screen, and past inspection details and inspection results can be confirmed. An inspection start button 406 is a button for instructing the start of inspection. When the inspection start button 406 is pressed, the inspection apparatus 109 shifts to inspection mode and notifies the printing apparatus 107 that it is in the inspection mode. When inspection is started, the inspection apparatus 109 starts inspection of transmitted sheet images.

The screens for when the inspection setting button 404 and the inspection result confirmation button 405 have been pressed are not directly related to the present invention, and thus, descriptions will be omitted; however, the screens for when the reference image registration button 403 and the inspection start button 406 have been pressed will be described with reference to FIGS. 5 and 6.

FIG. 5 depicts a view illustrating an example of a reference image registration screen 500 to be displayed on the display unit 241 after the reference image registration button 403 has been pressed and reference image reading has been completed in the inspection apparatus 109 according to the first embodiment.

In a display area 501, an image of a printed sheet that has been read by the inspection apparatus 109 is displayed, and if there are a plurality of images, the image to be displayed is changed by the switch button 502. When performing inspection of both the front and back sides, it is possible to switch the front and back of the image to be displayed in the display area 501 with a switching button 503. An inspection skip area setting button 504 is a button for instructing setting of an area for which to skip inspection. With this button 504, an area for which to not perform inspection can be set for printing (e.g., variable data printing (VDP)) in which print content of a particular area is changed for each copy, for example. In variable data printing, a different ID may be printed for each copy or configuration may be such that only an address and a name are changed for each copy.

A registration button 505 is a button for an operator to instruct registration of a read image that is in the display area 501 as a reference image after having confirmed the displayed image. When the registration button 505 is pressed, the inspection apparatus 109 performs reference image registration and returns to the screen 400 of FIG. 4. A cancel button 506 is a button for canceling reference image registration. When the cancel button 506 is pressed, the inspection apparatus 109 returns to the screen 400 of FIG. 4 without performing reference image registration. When the registration button 505 or the cancel button 506 is pressed and the screen 400 of FIG. 4 is returned to, the inspection apparatus 109 shifts to normal mode in which inspection is not performed and notifies the printing apparatus 107 that it is in the normal mode.

FIG. 6 depicts a view illustrating an example of a home screen 600 to be displayed on the display unit 241 when the inspection start button 406 is pressed after a plurality of reference images have been registered in the inspection apparatus 109 according to the first embodiment. In FIG. 6, the same configurations as in FIG. 4 described above are denoted by the same reference numerals, and descriptions thereof will be omitted.

A message 601 is a message prompting selection of images to be used for inspection from a plurality of registered reference images. A plurality of registered reference images are displayed in a display area 602. In FIG. 6, examples of registered reference images are displayed. Images of documents may be displayed as in the display area 602 or only the registered names may be displayed. Scroll buttons 603 and 604 are buttons for scrolling the screen left and right to select a reference image that is outside the screen. Selection boxes 605 to 607 are used to select reference images. On this screen, when a reference image to be used for inspection is selected, a check mark is displayed in the corresponding selection boxes 605 to 607. When the inspection start button 406 is pressed after one or more reference images have thus been selected, an inspection process in which the selected one or more reference images are used is started.

As described above, when performing inspection settings for the inspection apparatus 109, inspection settings are performed on the screens illustrated in FIGS. 4 to 6 to be displayed on the display unit 241 of the inspection apparatus 109. Meanwhile, instructions for the inspection apparatus 109 to convey a sheet on which a barcode has been printed, a printed sheet to be registered as a reference image, or a printed sheet to be inspected are issued from the external controller 102.

Figure 7:
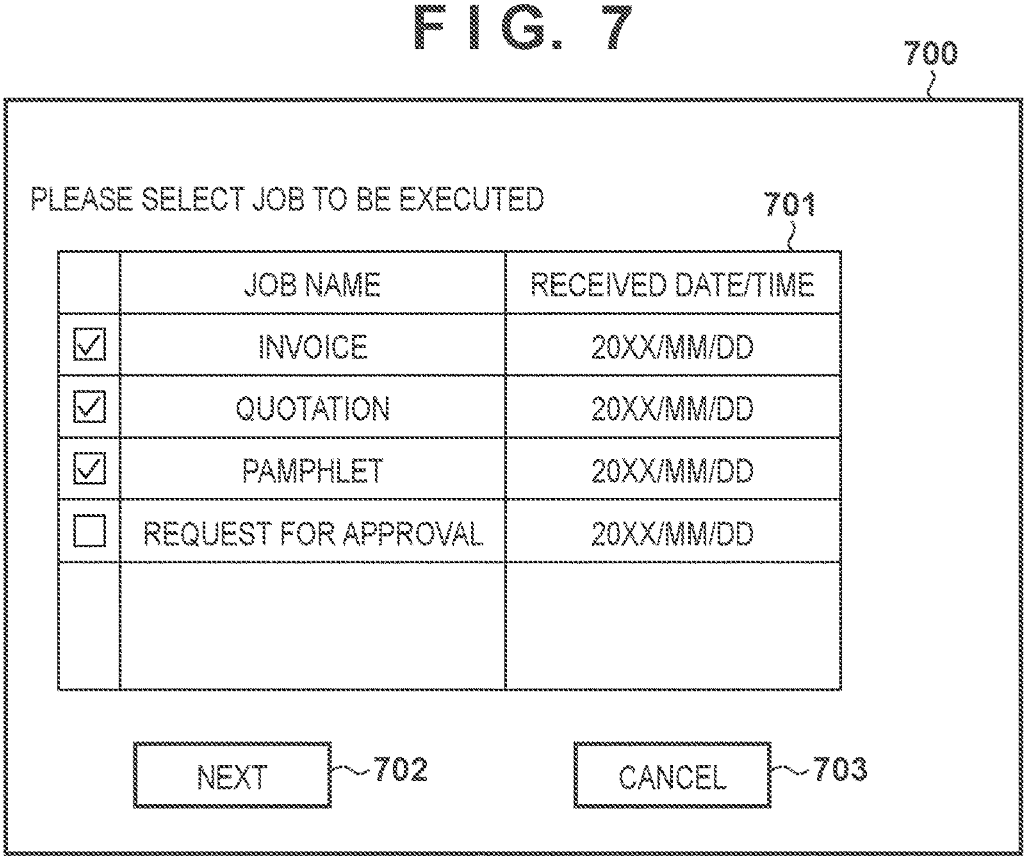
FIG. 7 depicts a view illustrating an example of a selection screen, which is for selecting an inspection job to be executed and is to be displayed on a display unit of the external controller according to the first embodiment.

FIG. 7 depicts a view illustrating an example of a selection screen 700, which is for selecting an inspection job to be executed and is to be displayed on the display unit 212 of the external controller 102 according to the first embodiment.

Figure 8:
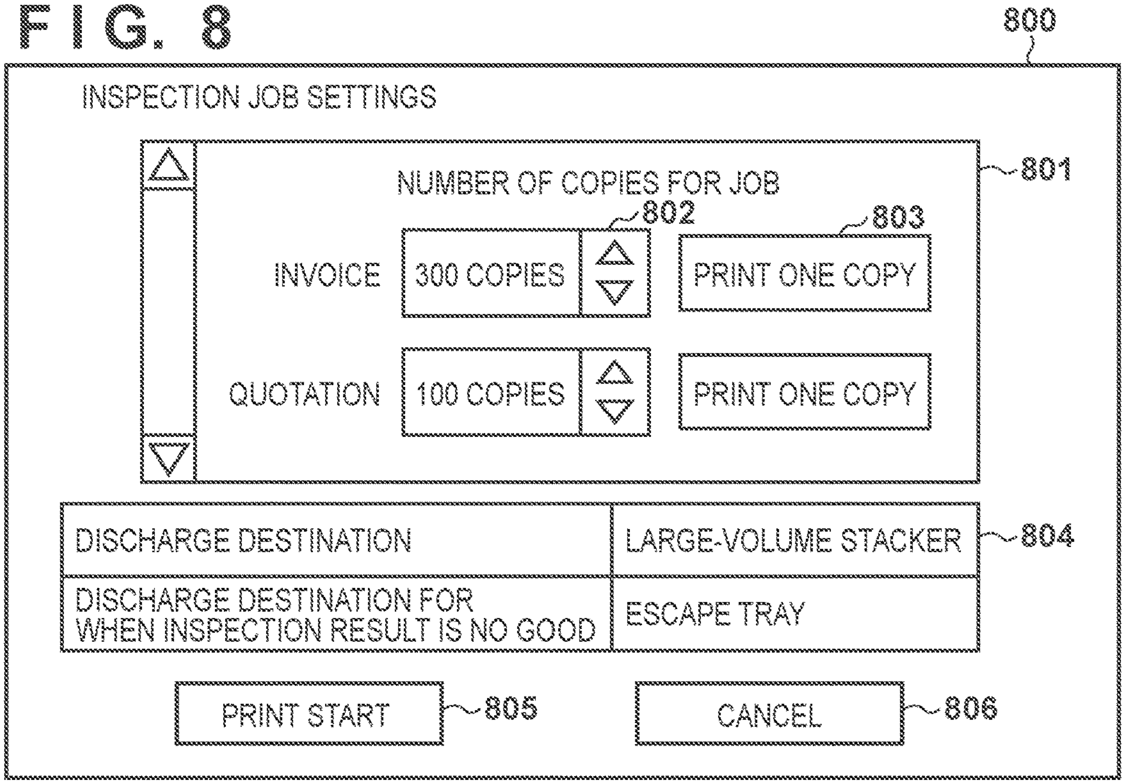
FIG. 8 depicts a view illustrating an example of an inspection job setting screen to be displayed on the display unit of the external controller according to the first embodiment.

A table 701 indicates a list of inspection jobs that have been received from the client PC 103. The table 701 indicates a state in which four jobs have been received from the client PC 103 and three jobs, which are “invoice”, “quotation”, and “pamphlet”, are selected as examples of jobs to be executed. When a “next” button 702 is pressed after inspection jobs to be executed have been selected from the list, an inspection job setting screen of FIG. 8 is switched to. A cancel button 703 cancels the settings on this screen and returns to the screen 600 of FIG. 6.

FIG. 8 depicts a view illustrating an example of an inspection job setting screen 800 to be displayed on the display unit 212 of the external controller 102 according to the first embodiment.

In an area 801, settings for each inspection job that has been selected in the selection screen 700 of FIG. 7 are performed. Here, in the number of copies 802, the numbers of copies for the job for inspection jobs, which are “invoice” and “quotation” that have been selected in FIG. 7, are set. In FIG. 8, as one example, the invoice is set to 300 copies and the quotation is set to 100 copies. A “print one copy” button 803 instructs that only one copy of an inspection job, which corresponds to “invoice”, for example, is printed. The “print one copy” button 803 is used, for example, when registering reference images in the inspection apparatus 109. Reference image registration procedure in which the “print one copy” button 803 is used is as follows.

The inspection apparatus 109 is instructed to start reference image registration by a press of the reference image registration button 403 of FIG. 4 displayed on the display unit 241 of the inspection apparatus 109. The external controller 102 is then instructed to print one copy of the inspection job for “invoice” by a press of the “print one copy” button 803 of the setting screen 800 of FIG. 8. Upon an instruction to print one copy, the printing apparatus 107 prints one copy for “invoice” according to a reference image registration job for “invoice”, and the inspection apparatus 109 reads images on sheets of the one copy printed by the inspection job for “invoice” and registers the read images as reference images for the inspection job.

In an area 804, discharge destinations of the inspection job are set. Here, the large-volume stacker 110 is set as a discharge destination, and the escape tray 346 is set as a discharge destination for discharge when it is determined in inspection that the image is a defect image.

A print start button 805 is a button for instructing a start of printing of an inspection job. Upon an instruction with the print start button 805 to start printing, the external controller 102 inputs an inspection job to the printing apparatus 107 based on the settings of the setting screen 800 of FIG. 8. For example, when the external controller 102 is instructed with the print start button 805 to start printing an inspection job after the inspection apparatus 109 has been instructed with the inspection start button 406 of FIG. 6 to start inspection, the external controller 102 inputs print data to the printing apparatus 107. Then, an instruction is issued to convey a printed sheet that has been printed by the printing apparatus 107 to the inspection apparatus 109. When the printed sheet is conveyed, the inspection apparatus 109 reads an image of the printed sheet and, after registering a reference image, performs the inspection process. A cancel button 806 is a button for discarding all of the settings in the setting screen 800 and making transition to the selection screen 700, for example.

Figure 12:
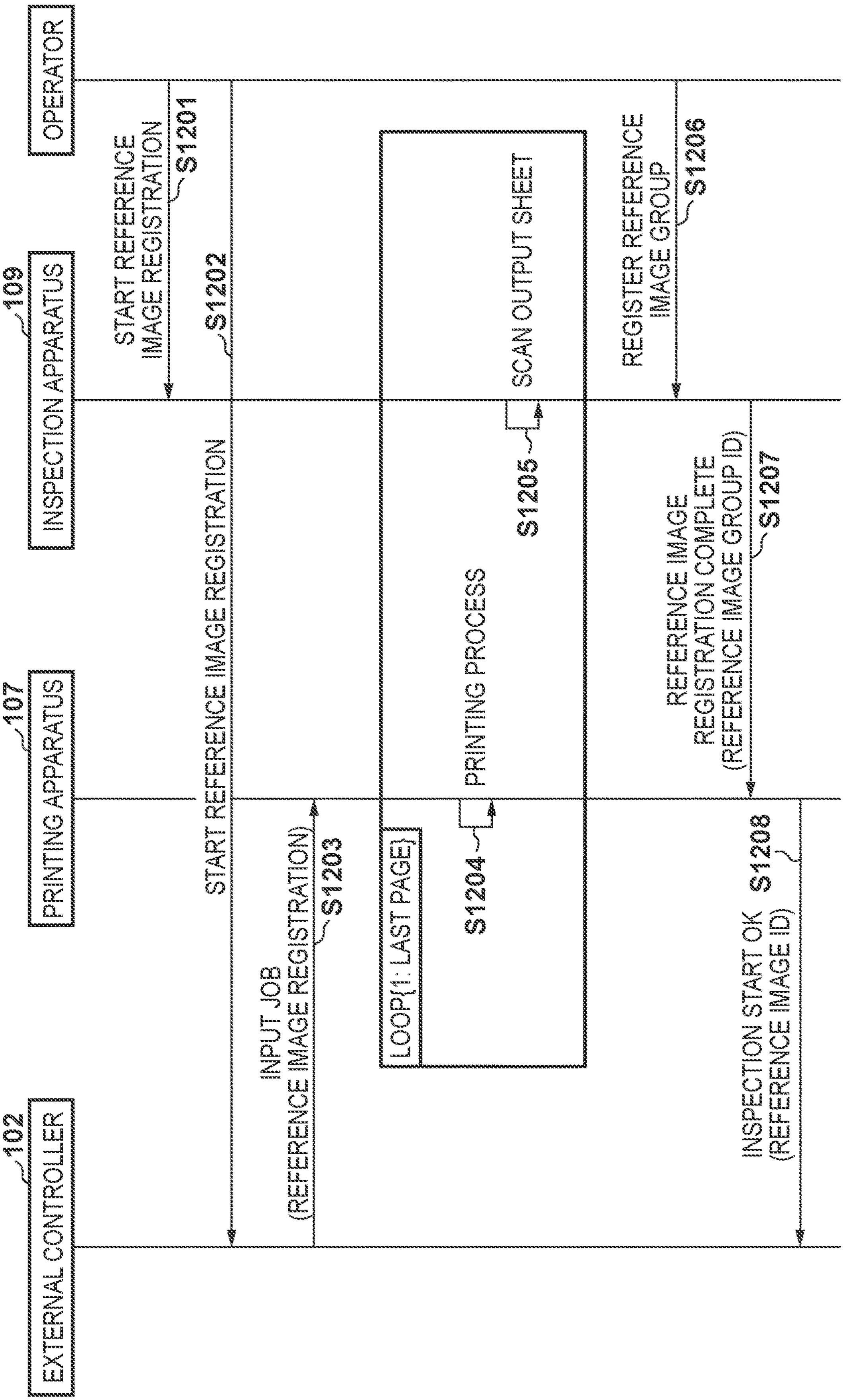
FIG. 12 is a sequence diagram for describing a sequence for when the external controller according to the first embodiment registers a reference image in the inspection apparatus using a received inspection job.

FIG. 12 is a sequence diagram for describing a sequence for when the external controller 102 according to the first embodiment registers a reference image in the inspection apparatus 109 using a received inspection job. The detailed operation of each apparatus is as described above, and a process that is specialized in reference image registration and is for explaining the first embodiment will be described.

First, in step S1201, the operator presses the reference image registration button 403, which is illustrated in FIG. 4, on the display unit 241 of the inspection apparatus 109 for the inspection apparatus 109 to enter a state in which it can read sheets. Next, in step S1202, the operator presses the “print one copy” button 803 of the setting screen 800 of FIG.

8 on the external controller 102. At this time, information that the job is a reference image registration job is included in a print job. In step S1203, the external controller 102 inputs the print job to the printing apparatus 107 via the internal LAN 105 and the video cable 106. At this time, the external controller 102 adds information that the job is a reference image registration job to the print job. When the print job is thus inputted from the external controller 102, in step S1204 the printing apparatus 107 prints image data according to the print job based on various kinds of settings.

Next, in step S1205, the imaging unit 240 of the inspection apparatus 109 scans an image of a printed sheet that has been conveyed from the printing apparatus 107 when the sheet passes through the inspection apparatus 109 and stores the scanned image in the memory 239. The printing apparatus 107 and the inspection apparatus 109 thus repeat the process of steps S1204 and S1205 for all the sheets for the one copy of the inputted reference image registration job, and when all the sheets have been read, the inspection apparatus 109 displays the above-described reference image registration screen 500 on the display unit 241.

In step S1206, when the operator presses the registration button 505, all of the scanned images are stored in the HDD 272 as a reference image group. At this time, the inspection apparatus 109 assigns a unique ID (identification information) (hereinafter, this ID is referred to as a reference image group ID) to the stored reference image group. Accordingly, the reference image group ID becomes an ID that is unique to a plurality of reference images.

Then, in step S1207, the inspection apparatus 109 notifies the printing apparatus 107 that reference image registration has been completed. At this time, the printing apparatus 107 is also notified of the reference image group ID that has been determined in step S1206. In step S1208, the printing apparatus 107 notifies the external controller 102 that the reference image registration has been completed and of the reference image group ID that has been notified from the inspection apparatus 109. The external controller 102 thus stores the notified reference image group ID in the HDD 210 in association with the print job that has been inputted in step S1202. Although it has been described that the inspection apparatus 109 determines the reference image group ID, a configuration in which determination is made by the external controller 102 or the printing apparatus 107 may be taken.

Figure 9:
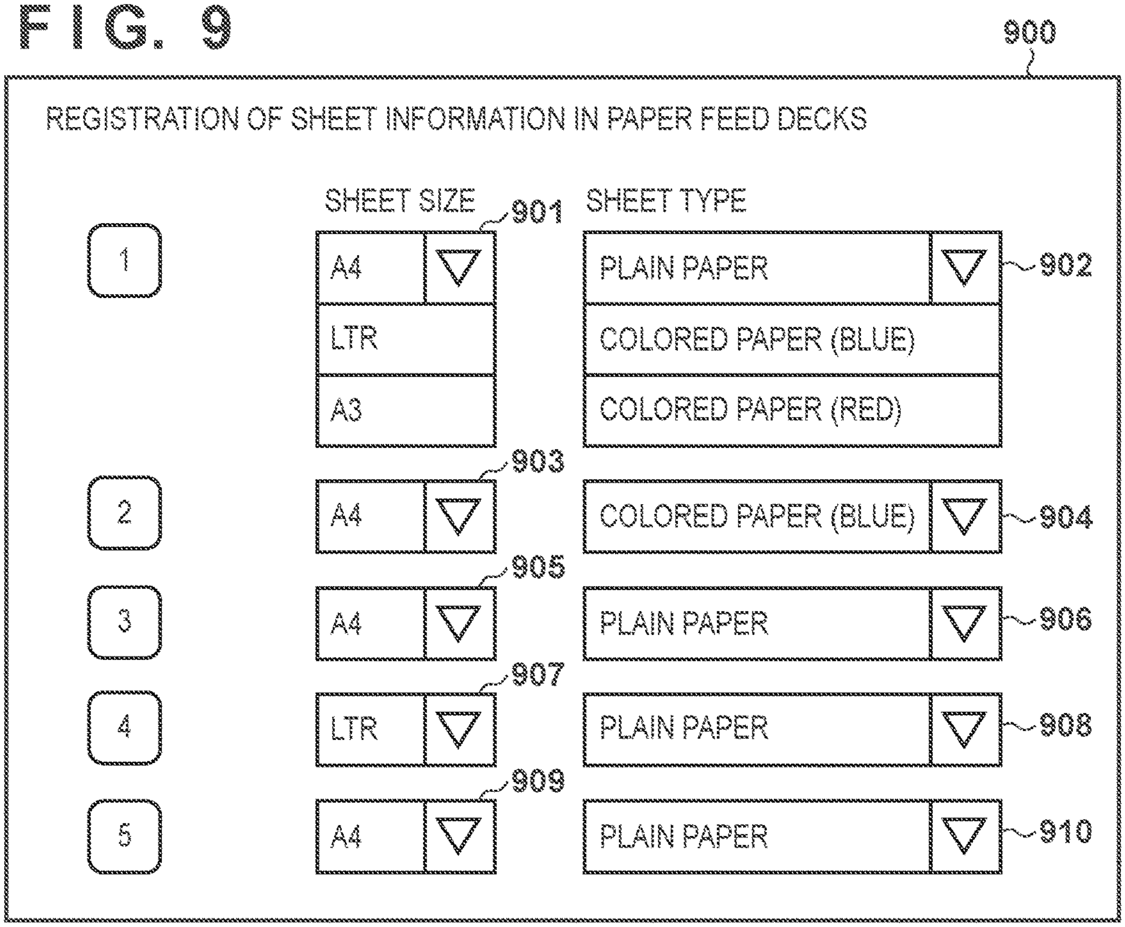
FIG. 9 depicts a view illustrating an example of a sheet information registration screen to be displayed on a display unit of a printing apparatus to set information of sheets that are stored in a paper feed deck of the image forming apparatus according to the first embodiment.

FIG. 9 depicts a view illustrating an example of a sheet information registration screen 900 to be displayed on the display unit 225 of the printing apparatus 107 to set information (sheet sizes and sheet types) of sheets that are stored in the paper feed decks 301, 302, 361, 362, and 363 of the image forming apparatus 101 according to the first embodiment.

A setting portion 901 is a setting portion for registering the size of sheets that are stored in the paper feed deck 301, and selection can be made by a pull-down menu. Here, A4, LTR, and A3 can be selected as a sheet size, and a state in which A4 has been selected for the paper feed deck 301 is illustrated. A setting portion 902 is a setting portion for registering the type of sheets that are stored in the paper feed deck 301, and selection can be made by a pull-down menu. Here, plain paper, colored paper (blue), and colored paper (red) can be selected, and a state in which plain paper has been selected for the paper feed deck 301 is illustrated.

A setting portion 903 is a pull-down menu for setting the size of sheets that are stored in the paper feed deck 302, and a setting portion 904 is a pull-down menu for setting the type of sheets that are stored in the paper feed deck 302. Here, a state in which A4 and colored paper (blue) are set for the paper feed deck 302 is illustrated.

A setting portion 905 is a pull-down menu for setting the size of sheets that are stored in the paper feed deck 361, and a setting portion 906 is a pull-down menu for setting the type of sheets that are stored in the paper feed deck 361. Here, a state in which A4 and plain paper have been selected for the paper feed deck 361 is illustrated.

Setting portions 907 and 908 are pull-down menus for respectively setting the size and type of sheets that are stored in the paper feed deck 362. Here, a state in which LTR and plain paper have been selected for the paper feed deck 362 is illustrated. Setting portions 909 and 910 are pull-down menus for respectively setting the size and type of sheets that are stored in the paper feed deck 363.

Here, a state in which A4 and plain paper have been selected for the paper feed deck 363 is illustrated. The sheet sizes and types that have thus been selected for the respective paper feed decks are set as information (sheet sizes and sheet types) indicating sheets that are stored in the respective paper feed decks.

Figure 10:
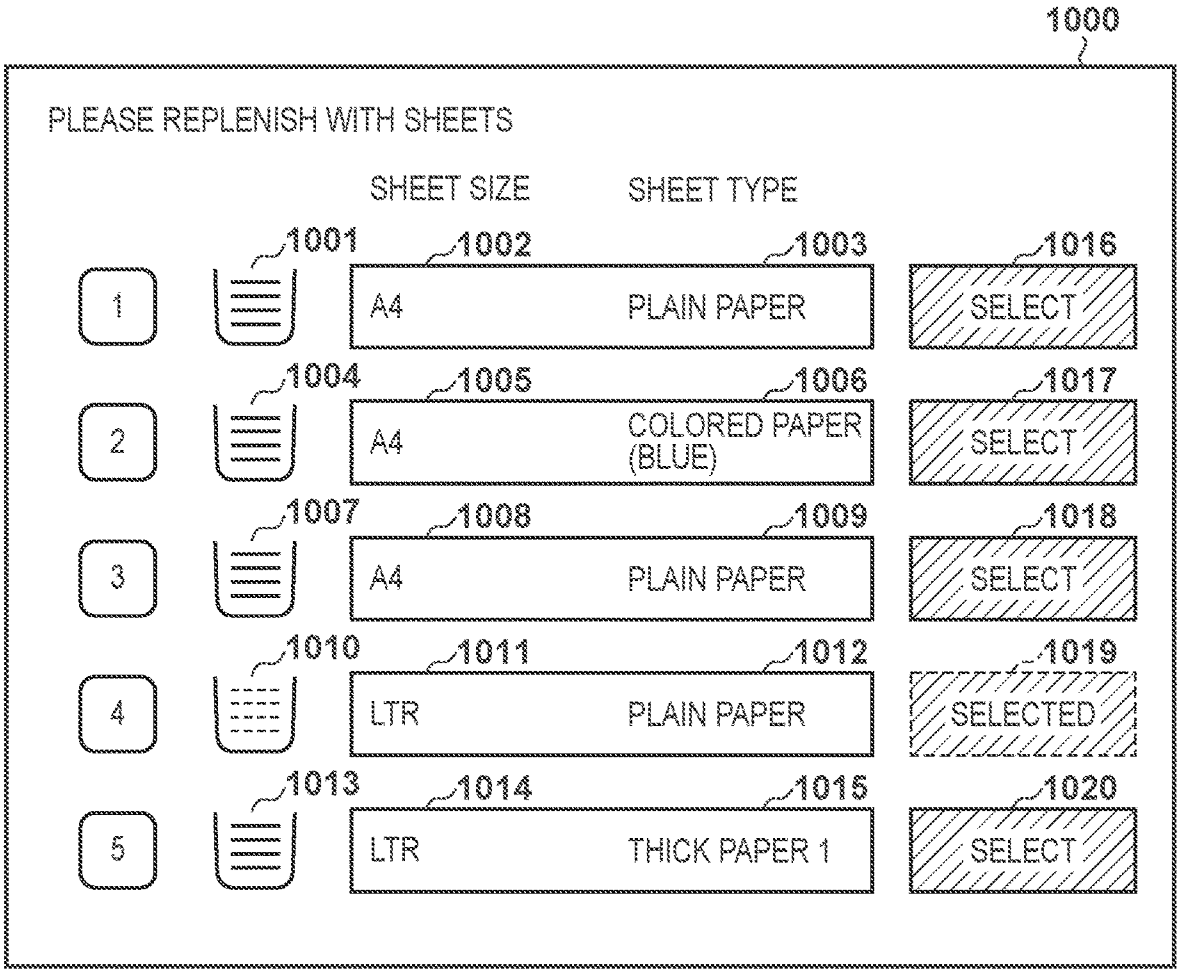
FIG. 10 depicts a view illustrating an example of a sheet outage screen that is for prompting replenishment of sheets and is to be displayed on the display unit of the printing apparatus when sheet outage occurs in any of the paper feed decks during printing in the printing apparatus according to the first embodiment.

FIG. 10 depicts a view illustrating an example of a sheet outage screen 1000 that is for prompting replenishment of sheets and is to be displayed on the display unit 225 of the printing apparatus 107 when sheet outage occurs in any of the paper feed decks during printing in the printing apparatus 107 according to the first embodiment.

An icon 1001 is an icon representing a remaining amount of sheets (sheet remaining amount) stored in the paper feed deck 301 and, here, represents a state in which there are sheets. Sheet information 1002 and 1003 represent information of sheets that are stored in the paper feed deck 301 and represent a state in which the sheet size is set to A4 and the sheet type is set to plain paper. Here, the paper feed deck 362 is selected as a paper feed deck that feeds sheets to be used for printing (corresponds to a selected button 1019), and printing and an inspection process in which sheets that have been fed from the paper feed deck 362 are used are executed. A select button 1016 is a button for changing to a setting in which the paper feed deck that feeds sheets to be used for printing is the paper feed deck 301 but, here, is displayed in a shaded manner, and even if the select button 1016 is pressed, that press will not be accepted.

An icon 1004 is an icon representing a remaining amount of sheets stored in the paper feed deck 302 and, here, represents a state in which there are sheets. Sheet information 1005 and 1006 represent information of sheets that are stored in the paper feed deck 302 and represent a state in which the sheet size is set to A4 and the sheet type is set to colored paper (blue). A select button 1017 is a button for changing to a setting in which the paper feed deck that feeds sheets to be used for printing is the paper feed deck 302 but, here, is displayed in a shaded manner, and even if the select button 1017 is pressed, that press will not be accepted.

An icon 1007 is an icon representing a remaining amount of sheets stored in the paper feed deck 361 and, here, represents a state in which there are sheets. Sheet information 1008 and 1009 represent information of sheets that are stored in the paper feed deck 361 and represent a state in which the sheet size is set to A4 and the sheet type is set to plain paper. A select button 1018 is a select button for changing to a setting in which the paper feed deck that feeds sheets to be used for printing is the paper feed deck 361 but, here, is displayed in a shaded manner, and even if the select button 1018 is pressed, that press will not be accepted.

An icon 1010 is an icon representing a remaining amount of sheets stored in the paper feed deck 362 and, here, represents a sheet outage state. Sheet information 1011 and 1012 represent information of sheets that are stored in the paper feed deck 362 and represent a state in which the sheet size is set to LTR and the sheet type is set to plain paper. The selected button 1019 indicates that the paper feed deck 362 is feeding, i.e., is a sheet feed source in this job. Here, the selected button 1019 is displayed in a shaded manner, and even if the selected button 1019 is pressed, that press will not be accepted.

An icon 1013 is an icon representing a remaining amount of sheets stored in the paper feed deck 363 and, here, represents a state in which there are sheets. Sheet information 1014 and 1015 represent information of sheets that are stored in the paper feed deck 363 and represent a state in which the sheet size is set to LTR and the sheet type is set to thick paper 1. A select button 1020 is a select button for changing to a setting in which the paper feed deck that feeds sheets to be used for printing is the paper feed deck 363 but, here, is displayed in a shaded manner, and even if the select button 1020 is pressed, that press will not be accepted.

Figure 19:
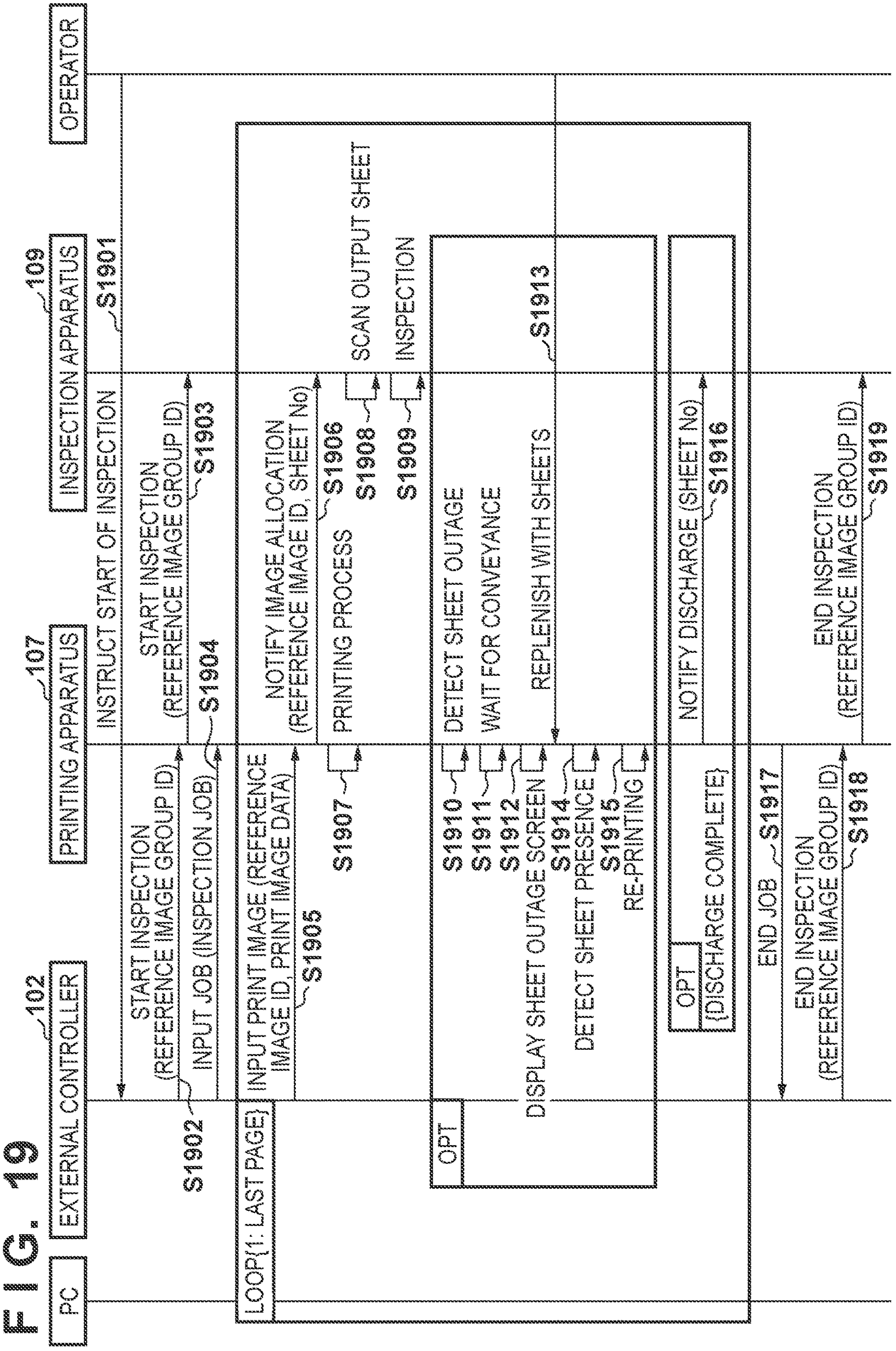
FIG. 19 is a sequence diagram for explaining a sequence for when sheet outage has occurred during execution of an inspection job in the image processing system according to the first embodiment.

FIG. 19 is a sequence diagram for explaining a sequence for when sheet outage has occurred during execution of an inspection job in the image processing system according to the first embodiment. The detailed operation of each apparatus is as described above, and a process that is specialized in cases where sheet outage occurs during an inspection job and is for explaining the first embodiment will be described.

In step S1901, after having selected a job on the screen 700 of FIG. 7 of the external controller 102, the operator sets an inspection job on the setting screen 800 of FIG. 8 and presses the print start button 805. At this time, the external controller 102 searches, in the HDD 210, for a reference image group ID corresponding to the reference images of the inspection job to be executed. The press of the print start button 805 by the operator in step S1901 is not an element that is always necessary. For example, the external controller 102 may be configured to transition to step S1902 by receiving a reference image registration completion notification from the printing apparatus in step S1207.

In step S1902, the external controller 102 notifies the printing apparatus 107 of the start of the inspection job with the reference image group ID that has been found in step S1901 via the internal LAN 105. Upon thus being notified of the start of the inspection job by the external controller 102, in step S1903 the printing apparatus 107 notifies the inspection apparatus 109 of the start of the inspection job with the received reference image group ID.

In step S1904, the external controller 102 inputs the selected print job to the printing apparatus 107 via the internal LAN 105 and the video cable 106. At this time, the external controller 102 adds information that the print job is an inspection target job to the print job. Next, in step S1905, the external controller 102 transmits a single page's worth of print image data to the printing apparatus 107 via the video cable 106 as well as the same reference image ID as that of the time of registration via the internal LAN 105.

Upon thus receiving the print image data, in step S1906 the printing apparatus 107 notifies the inspection apparatus 109 of the received reference image ID and sheet number for printing that image (position of the sheet in the order of printing). A sheet number is a numerical value that is incremented for each fed sheet from when the power of the printing apparatus 107 is turned on until when it is turned off. The inspection apparatus 109 thus stores the reference image IDs and the sheet numbers in association with each other in a table 1401 (FIG. 14) in the memory 239, and reorganizes the sheet numbers in an ascending order.

Figures 14, 15:
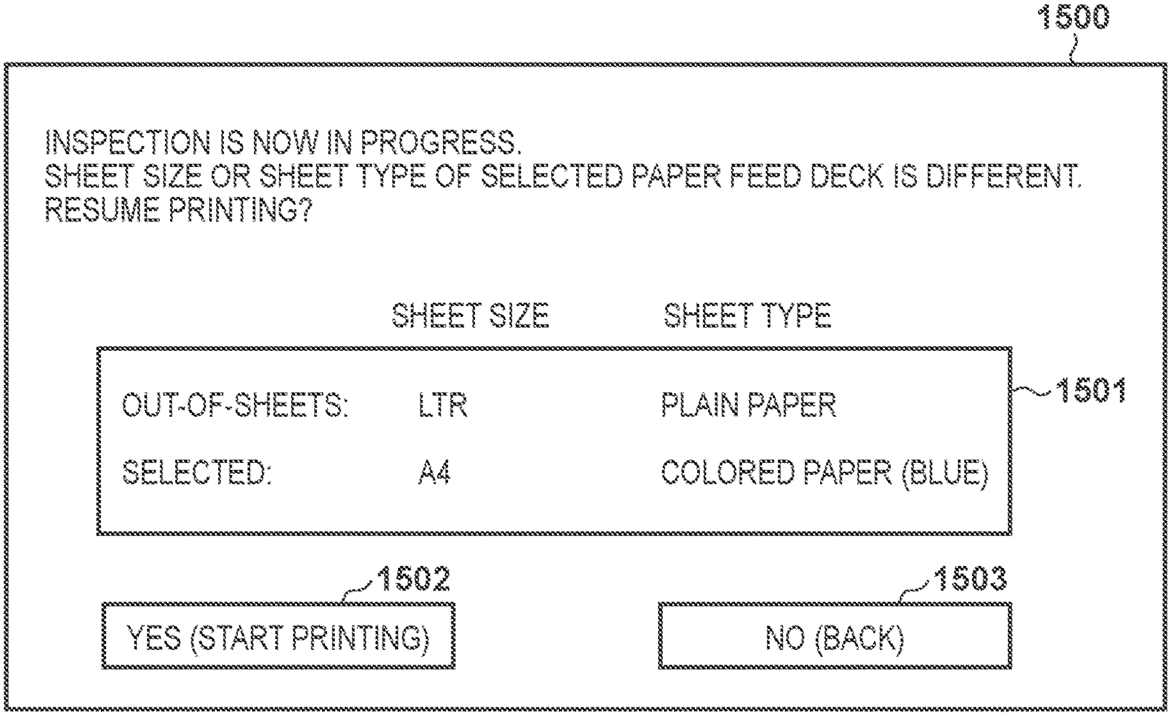
FIG. 14 is a diagram illustrating an example of a table that stores, for example, inspection results of sheets and is held by the inspection apparatus according to the first embodiment and in which reference image IDs and sheet numbers are associated.
FIG. 15 depicts a view illustrating an example of a warning screen to be displayed when a paper feed deck for which sheet information that is different from sheet information that has been set in a paper feed deck in which sheet outage has occurred during inspection in the printing apparatus according to the first embodiment has been set has been selected.

FIG. 14 is a diagram illustrating an example of the table 1401 that stores, for example, inspection results of sheets and is held by the inspection apparatus 109 according to the first embodiment and in which reference image IDs and sheet numbers are associated.

In the table 1401 of FIG. 14, a column 1402 stores sheet numbers, here, in an ascending order. A column 1403 stores reference image IDs that correspond to the sheet numbers. A column 1404 stores a status indicating whether a scanned image for which a sheet that corresponds to the sheet number has been scanned has been generated in the inspection apparatus 109. Here, if generated, "done" is stored; if not, "not done" is stored. A column 1405 stores the result of the inspection process in which comparison with the reference image is performed (the initial value is "not done"). If the inspection result is ok, "OK" is stored; if not good, "NG" is stored. A column 1406 stores a status indicating whether the inspected sheet has been discharged (the initial value is "not done"). If discharged, "done" is stored.

Next, in step S1907, the printing apparatus 107 prints the print image data based on various kinds of settings, and conveys the printed sheet to the inspection apparatus 109. Accordingly, in step S1908, the imaging unit 240 of the inspection apparatus 109 generates a scanned image of the sheet that has been conveyed from the printing apparatus 107 by scanning an image that is on the sheet when the sheet passes through the inspection apparatus 109. In addition, the status of generation of the scanned image of the smallest sheet number among those for which the status of the column 1404 is "not done" in the table 1401 is changed to "done". In step S1909, the inspection apparatus 109 performs comparison with the reference image data that is associated with the reference image ID of the column 1403 that corresponds to the smallest sheet number among those for which the inspection result of the column 1405 is "not done" in the table 1401 and, based on the result, records "OK" or "NG" in the inspection result of the column 1405.

Upon discharging the sheet to a designated output tray without jam occurring, in step S1916 the printing apparatus 107 notifies the inspection apparatus 109 of the number of that discharged sheet. Thus, the inspection apparatus 109 changes the discharge status of the column 1406 of the row (record) that holds the sheet number that matches the received sheet number to "done" in the table 1401. Thus, the process of steps S1905 to S1909 and S1916 is repeatedly executed on all the sheets of the inputted print job. If sheet outage occurs in the paper feed deck during the process, the process of steps S1910 to S1915 to be described below will be performed.

First, in step S1910, the printing apparatus 107 detects the occurrence of sheet outage. Next, in step S1911, the printing apparatus 107 waits for sheets that are being conveyed to be discharged. In step S1912, the printing apparatus 107 displays a sheet outage screen on the operation unit 224. Upon seeing the sheet outage screen, in step S1913 the operator replenishes the paper feed deck with sheets. Thus, in step S1914, the printing apparatus 107 detects that the sheet has been replenished in S1914. Upon detecting the presence of sheets in step S1914, in step S1915 the printing apparatus 107 executes the printing process from step S1907.

Accordingly, upon discharge of all the sheets, in step S1917 the printing apparatus 107 notifies the external controller 102 of the end of the print job. Upon receiving the end of the print job, in step S1918 the external controller 102 notifies the printing apparatus 107 of the end of inspection job with the reference image group ID that has been found in step S1901 via the internal LAN 105. Upon thus being notified of the end of inspection job by the external controller 102, in step S1919 the printing apparatus 107 notifies the inspection apparatus 109 of the end of the inspection job.

Figure 11:
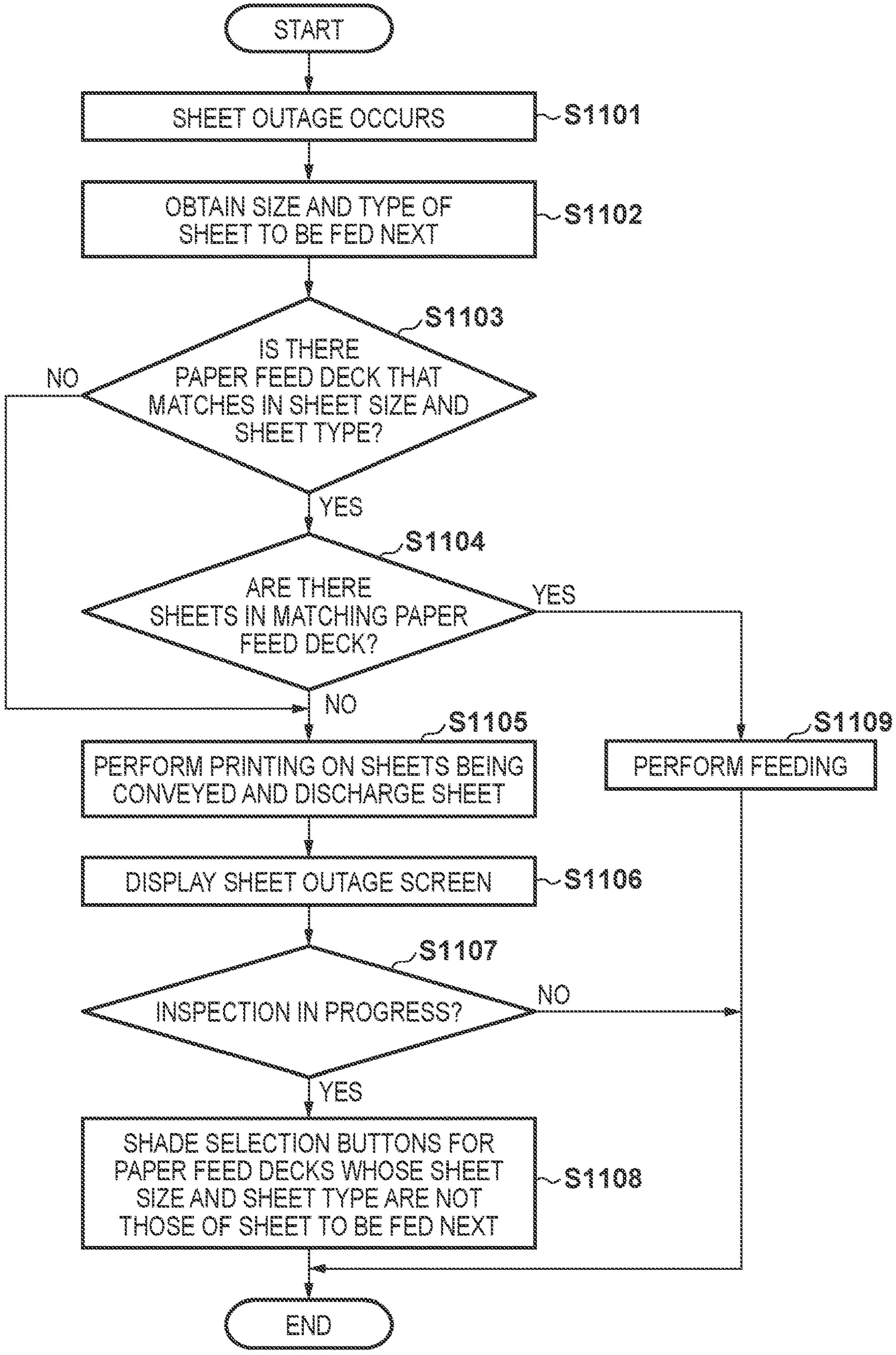
FIG. 11 is a flowchart for explaining a process from detection of occurrence of sheet outage during execution of an inspection job to stopping of the inspection job in the printing apparatus according to the first embodiment.

FIG. 11 is a flowchart for explaining a process from detection of occurrence of sheet outage during execution of an inspection job to stopping of the inspection job in the printing apparatus 107 according to the first embodiment. Steps S1101 to S1109 in the drawing represent the respective steps. A program of the printing apparatus 107 that is related to the flowchart is stored in the HDD 221, and the process that is described in the flowchart is executed by the CPU 222 of the printing apparatus 107 deploying the program in the memory 223 and executing the program.

In step S1101, the CPU 222 detects that sheet outage has occurred in the feeding paper feed deck. Next, the process proceeds to step S1102, and the CPU 222 obtains the size/type (sheet information) of a sheet to be fed next based on the settings of the print job and proceeds to step S1103. In step S1103, the CPU 222 determines whether sheets that match the sheet size and the sheet type that have been obtained in step S1102 are set in any of the paper feed decks 301, 302, 361, 362, and 363. Here, if matching sheets are set, the process proceeds to step S1104, and if matching sheets are not set, the process proceeds to step S1105.

In step S1104, the CPU 222 determines whether there are sheets in the paper feed deck in which sheets that match the sheet size and the sheet type that have been obtained in step S1102 are set and, if there are sheets in the paper feed deck, the process proceeds to step S1109, and the CPU 222 performs sheet feeding from the determined paper feed deck, and ends the process. Meanwhile, if it is determined in step S1104 that there are no sheets in the paper feed deck, the process proceeds to step S1105. In step S1105, the CPU 222 performs printing on sheets that are being conveyed and waits until the printed sheets have been discharged. Next, the process proceeds to step S1106, and the CPU 222 displays a sheet outage screen 1300, which is illustrated in FIG. 13, on the display unit 225 of the printing apparatus 107.

Figure 13:
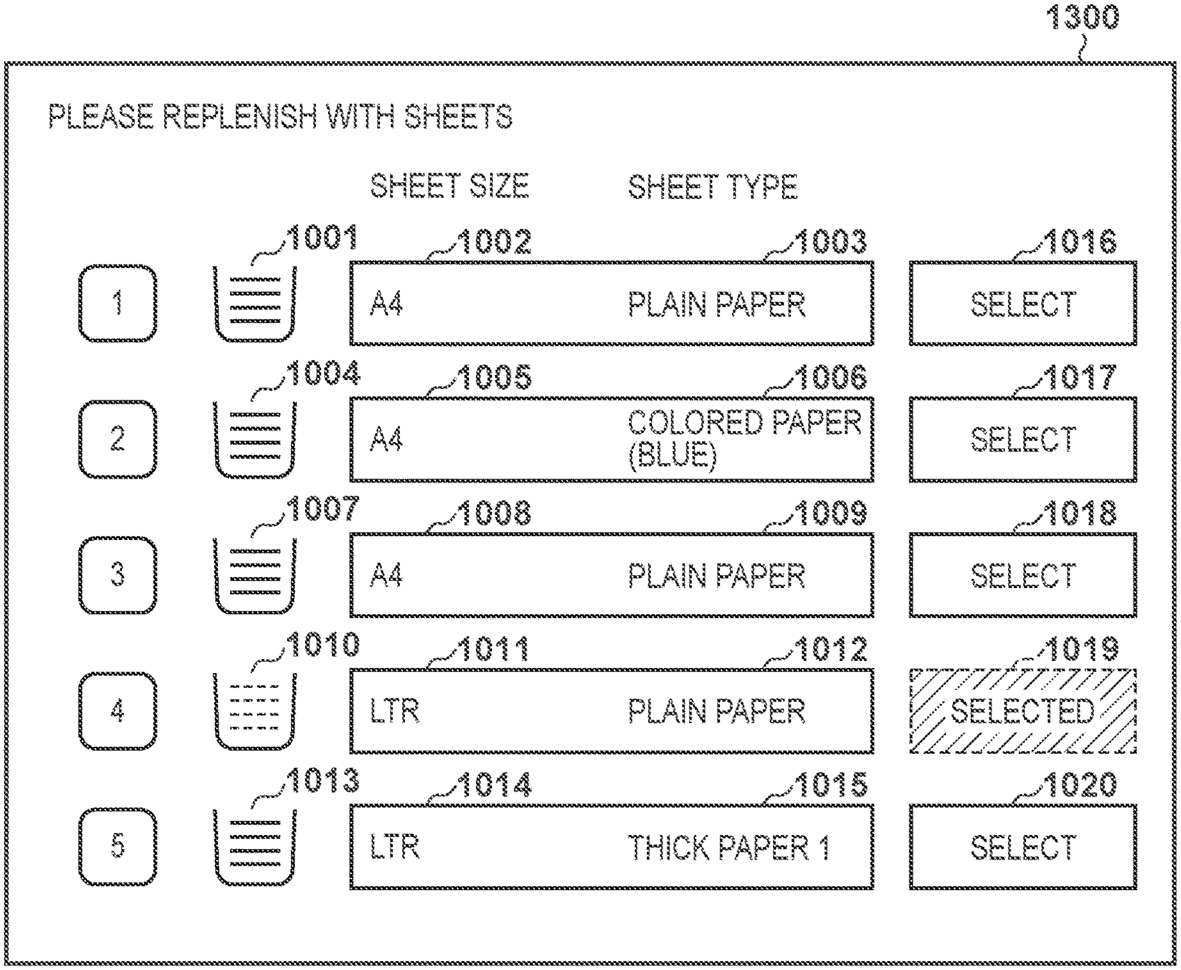
FIG. 13 depicts a view illustrating an example of the sheet outage screen to be displayed on the display unit of the printing apparatus when sheet outage occurs in any of the paper feed decks during printing in the printing apparatus according to the first embodiment.

FIG. 13 depicts a view illustrating an example of the sheet outage screen 1300 to be displayed on the display unit 225 of the printing apparatus 107 when sheet outage occurs in the paper feed deck 362 during printing in the printing apparatus 107 according to the first embodiment. In FIG. 13, the portions that are in common with those of FIG. 10 described above are denoted by the same reference numerals, and descriptions thereof are omitted.

FIG. 13 illustrates a state in which the paper feed deck 362 is designated as the feed source paper feed deck that feeds sheets to be used for printing and sheet outage has occurred in the paper feed deck 362, similarly to FIG. 10. A portion that is different from those of FIG. 10 is that the selection buttons 1016 to 1018 and 1020 by which the paper feed deck can be selected as the feed source paper feed deck are displayed in a selectable manner.

Next, the process proceed to step S1107, and the CPU 222 determines whether inspection is being executed in the print job; if inspection is in progress, the process proceeds to step S1108, and if inspection is not in progress, the process is ended. In step S1108, the CPU 222 displays the sheet outage screen 1000, which prompts replenishment of sheets and is illustrated in FIG. 10, on the display unit 225 of the printing apparatus 107. In the sheet outage screen 1000, the selection buttons 1016, 1017, 1018, and 1020 of paper feed decks in which sheets whose sheet size and sheet type do not match those of the sheet to be fed next are set are displayed in a shaded manner so as not to be selectable. Accordingly, if inspection is in progress, a screen such as the sheet outage screen 1000, which is illustrated in FIG. 10, will be displayed so that the operator cannot select any one of the paper feed decks because there is no paper feed deck that stores the sheets whose sheet size and sheet type match those of the sheet to be fed next, and if inspection is not in progress, a screen such as the sheet outage screen 1300, which is illustrated in FIG. 13, will be displayed.

In the process that has been described in FIG. 11, when sheet outage occurs during inspection, the selection buttons of the paper feed decks whose sheet size or sheet type is different from the settings of the print job are displayed in a shaded manner so as not to be selectable. However, the selection buttons are not shaded as in the case of the selection buttons 1016, 1017, 1018, and 1020 of FIG. 13 such that the user can press them. Then, when a selection button is pressed, a warning such as that of a warning screen 1500, which is illustrated in FIG. 15, may be displayed on the display unit 225 of the printing apparatus 107.

FIG. 15 depicts a view illustrating an example of a warning screen to be displayed when a paper feed deck for which sheet information that is different from sheet information that has been set in a paper feed deck in which sheet outage has occurred during inspection in the printing apparatus 107 according to the first embodiment has been set has been selected.

In FIG. 15, an area 1501 displays the sheet size and the sheet type that have been set for the paper feed deck in which sheet outage has occurred, and the sheet size and the sheet type of a newly selected paper feed deck. In this state, when a yes button 1502 is pressed, feeding is performed from the selected paper feed deck and printing is resumed. Meanwhile, when a no button 1503 is pressed, the screen 1300 of FIG. 13 is displayed on the display unit 225 of the printing apparatus 107.

In the first embodiment, a sequence in which a reference image registration job and an inspection job are each separately inputted from the external controller 102 has been described. However, the invention is not limited thereto and may be configured such that, for example, one job, for example, an inspection job, is inputted from the external controller 102 and the printing apparatus 107 executes a registration job and an inspection job based on the input job.

As described above, according to the first embodiment, when sheet outage occurs in a paper feeding unit that is a sheet feeding source of sheets to be used for printing at the time of execution of the inspection job, a paper feeding unit that is storing sheets whose size and type are the same as those of the sheets to be used for printing can be selected. Accordingly, there is an advantage of eliminating erroneous determination that the inspection result is no good despite an image of a printed matter being normal, which is caused by, for example, a difference in the appearance of color of the background portions due to a difference in the type of the sheet on which a reference image has been read and the type of the sheet of a printed matter to be inspected.

If, at the time of inspection job execution, a paper feeding unit in which sheets whose sheet size and sheet type are different from the sheet size and the sheet type that has been set for the paper feed deck in which sheet outage has occurred are stored is erroneously selected, by giving a warning, it is possible to prevent erroneous determination that an inspection result is no good due to the sheet type being different.

SECOND EMBODIMENT

In the first embodiment, an example in which, in reference image registration, reference images are obtained by printing only one copy of an inspection job and reading the printed sheets has been described. In contrast to this, in the second embodiment, a method in which reference images are registered using a different method and prevention of a no-good inspection result due to user error when sheet outage occurs will be described. That is, in the second embodiment, instead of registering scanned images as reference images, registration is performed using image data (RIP images) for which the RIP process (raster image developing) has been performed on print data. Since a system configuration according to the second embodiment, a hardware configuration of each apparatus, and the like are similar to those of the first embodiment described above, descriptions thereof will be omitted.

Figure 16:
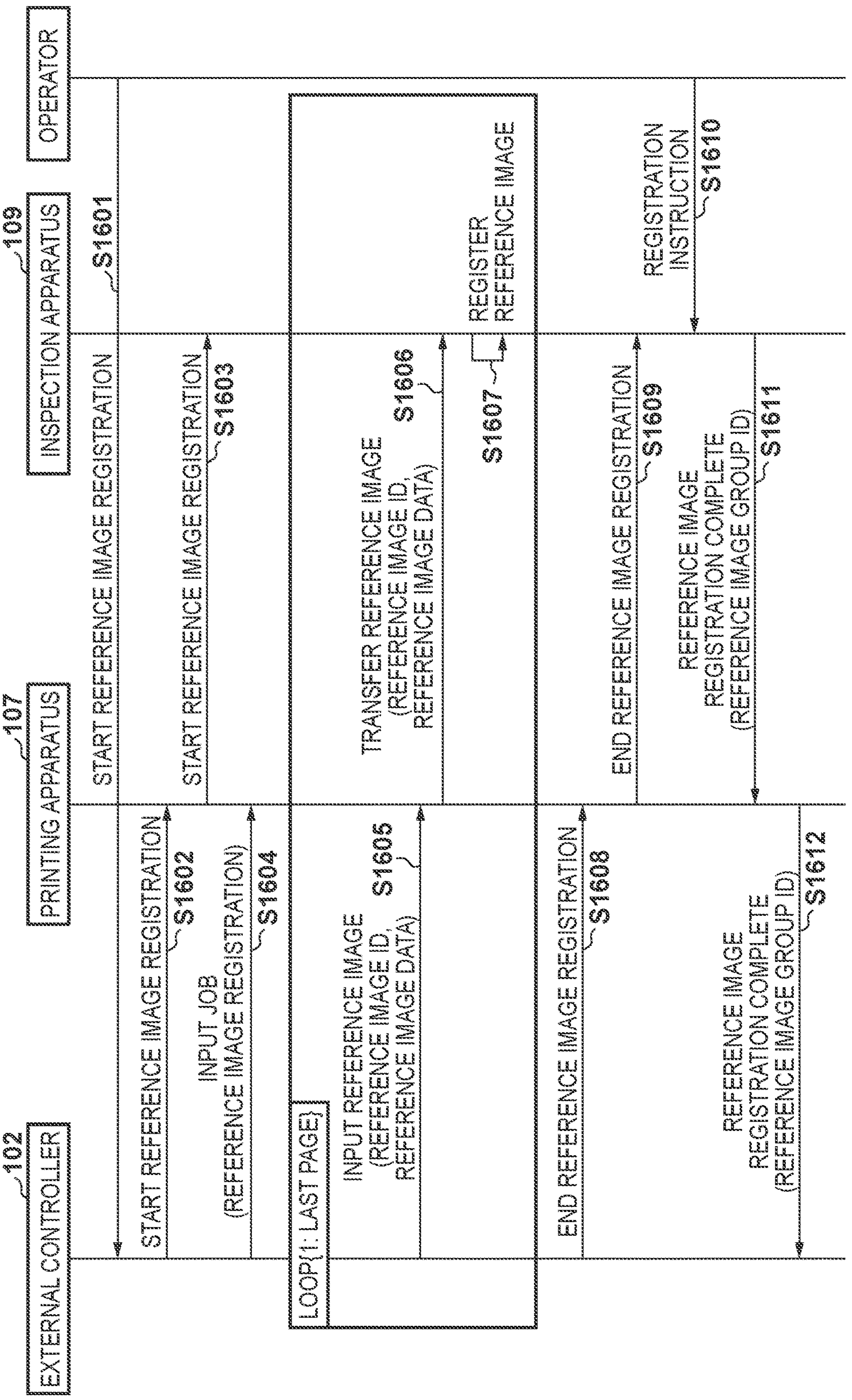
FIG. 16 is a diagram for describing a processing sequence for when the external controller according to a second embodiment registers a reference image in the inspection apparatus using a received inspection job.

FIG. 16 is a diagram for describing a processing sequence for when the external controller 102 according to the second embodiment registers reference images in the inspection apparatus 109 using a received inspection job. The detailed operation of each apparatus is as described above, and a process that is specialized in reference image registration and is for explaining the second embodiment will be described.

First, in step S1601, the operator presses the "print one copy" button 803 of the setting screen 800 of FIG. 8 on the external controller 102. At this time, information that the job is a reference image registration job is added to print data. Upon receipt of print data to which information that it is a reference image registration job has been added, in step S1602 the external controller 102 notifies the printing apparatus 107 of the start of reference image registration via the internal LAN 105.

Upon being notified of the start of reference image registration by the external controller 102, in step S1603 the printing apparatus 107 notifies the inspection apparatus 109 of the start of reference image registration. Upon being notified of the start of reference image registration, the inspection apparatus 109 performs the same process as when the reference image registration button 403 is pressed on the screen 400 of FIG. 4 from the operation unit 242 and determines a reference image group ID. Next, in step S1604, the external controller 102 inputs the print job to the printing apparatus 107 via the internal LAN 105. At this time, information that the job is a reference image registration job is added to print data.

Next, in step S1605, the external controller 102 transmits a single page's worth of reference image data to the printing apparatus 107 via the video cable 106 as well as an identification number (hereinafter, reference image ID) of the reference image via the internal LAN 105. In step S1606, the printing apparatus 107 thus receives the reference image data, performs image conversion, and transmits the converted image data and the reference image ID to the inspection apparatus 109 via the communication cable 259, the communication I/F 217 and the communication I/F 237. In step S1607, the inspection apparatus 109 thus receives the reference image data, performs image conversion, and, upon associating the reference image, which is the converted image data, and the reference image ID, stores them in the HDD 272 in association with the reference image group ID. Upon thus repeating the process of step S1605 until the last page, in step S1608 the external controller 102 notifies the printing apparatus 107 of the end of the reference image registration via the internal LAN 105.

Upon thus being notified of the end of reference image registration from the external controller 102, in step S1609 the printing apparatus 107 notifies the inspection apparatus 109 of the end of reference image registration. Upon receiving the end of reference image registration, the inspection apparatus 109 displays the reference image registration screen 500 of FIG. 5. Next, in step S1610, when the operator presses the registration button 505 on the registration screen 500, in step S1611 the inspection apparatus 109 notifies the printing apparatus 107 that reference image registration has been completed. At this time, the reference image group ID that has been determined in step S1603 is also notified.

In step S1612, the printing apparatus 107 notifies the external controller 102 that reference image registration has been completed and of the reference image group ID that has been notified from the inspection apparatus 109. The external controller 102 stores the notified reference image group ID in the HDD 210 in association with print data and image data transmitted in step S1605. The press of the registration button 505 by the operator in step S1601 is not an element that is always necessary. For example, a configuration may be taken such that, when the inspection apparatus 109 determines that the reference image registration process of step S1607 has been repeated until the last page, the process proceeds to step S1611 and the printing apparatus 107 is notified reference image registration has been completed.

Figure 17:
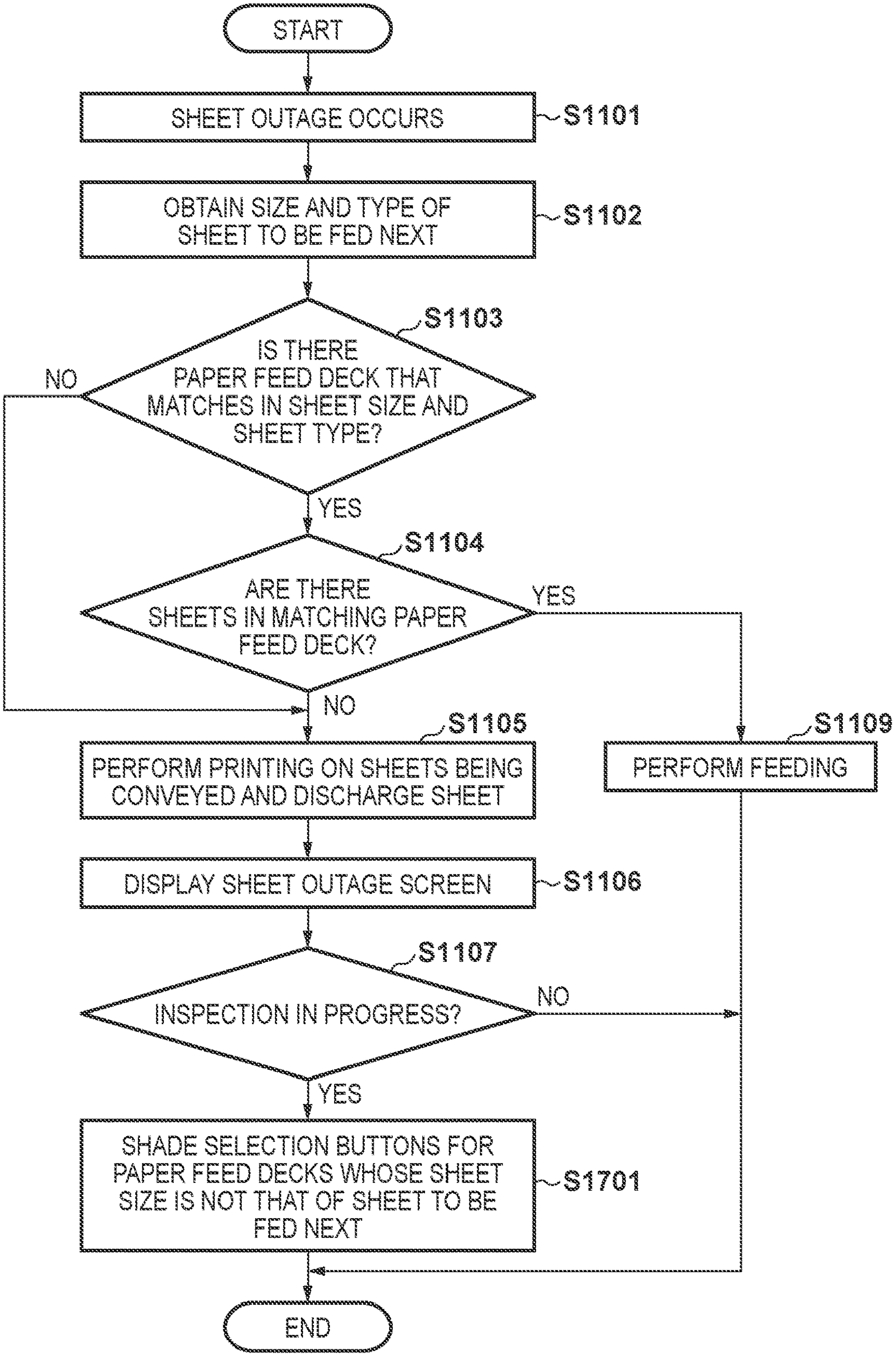
FIG. 17 is a flowchart for explaining a process from detection of occurrence of sheet outage during execution of an inspection job to stopping of the inspection job in the printing apparatus according to the second embodiment.

FIG. 17 is a flowchart for explaining a process from detection of occurrence of sheet outage during execution of an inspection job to stopping of the inspection job in the printing apparatus 107 according to the second embodiment. In FIG. 17, the same process as the process of FIG. 11 described above is denoted by the same reference numeral, and descriptions thereof are omitted. A program of the printing apparatus 107 that is related to the flowchart is stored in the HDD 221, and the process that is described in the flowchart is executed by the CPU 222 deploying the program in the memory 223 and executing the program.

In step S1107, the CPU 222 determines whether inspection is being executed in the print job; if inspection is in progress, the process proceeds to step S1701, and if inspection is not in progress, the process is ended. In step S1701, the CPU 222 shades, in the sheet outage screen 1300 of FIG. 13, the selection buttons of the paper feed decks in which sheets that do not match the size of sheet to be fed are stored. In step S1701 of FIG. 17, the selection buttons of the paper feed decks whose sheet size matches and sheet type does not match are not shaded, unlike in step S1108 of FIG. 11 according to the first embodiment. That is, the paper feed decks that store sheets whose size matches the size of sheets that are used in the inspection job are made selectable.

Figure 18:
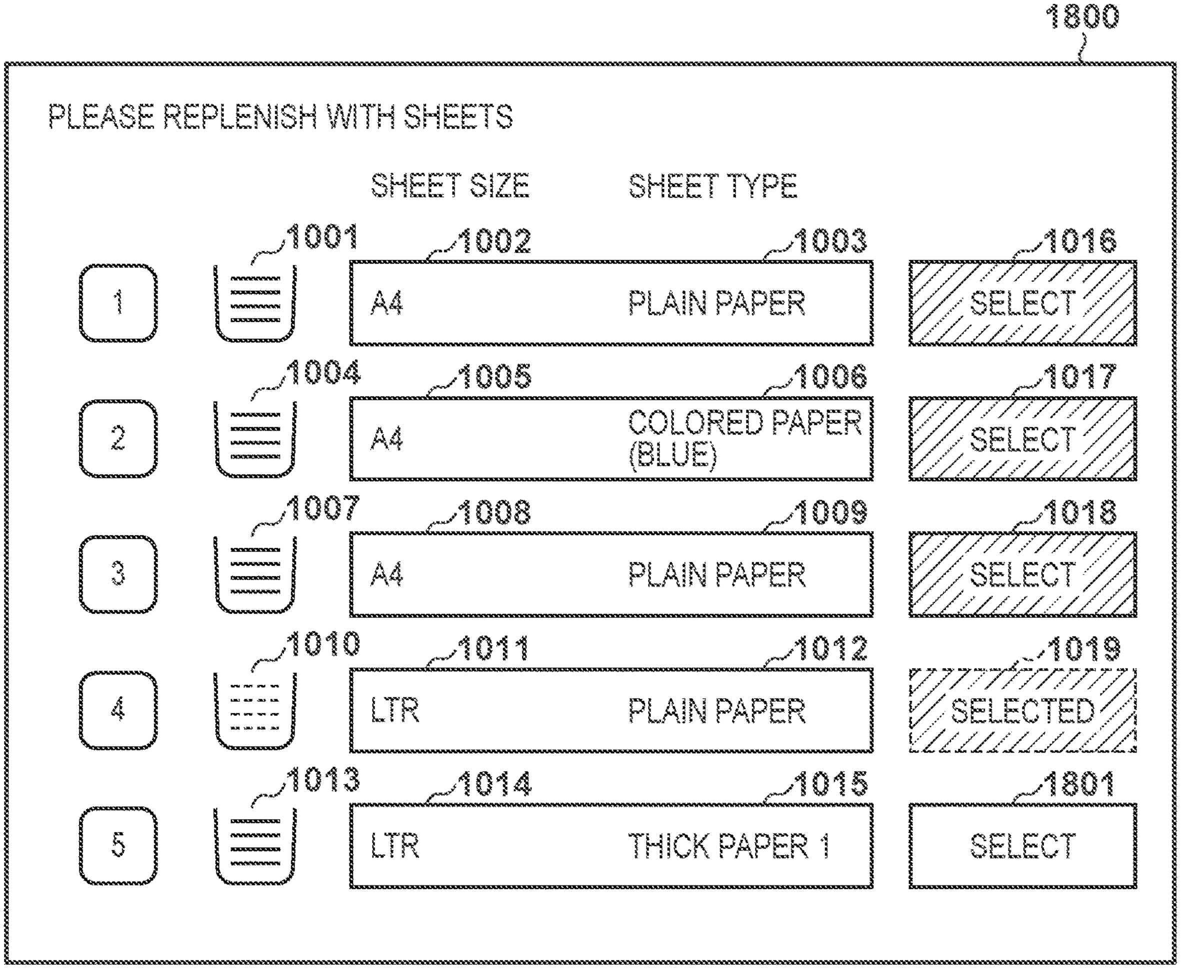
FIG. 18 depicts a view illustrating an example of a sheet outage screen for when sheet outage has occurred during printing in step S1701 of FIG. 17 according to the second embodiment.

FIG. 18 depicts a view illustrating an example of a sheet outage screen for when sheet outage has occurred during printing in step S1701 of FIG. 17 according to the second embodiment.

Here, during execution of an inspection job, as shown by the icon 1010, sheet outage has occurred in the paper feed deck 362 in a state in which the paper feed deck 362 is selected as a sheet feed source. At this time, as illustrated in the sheet information 1014 and 1015, the thick paper 1 of the LTR size is stored in the paper feed deck 363. Accordingly, being both LTR, the sheet size of the paper feed deck 362 and the sheet size of the paper feed deck 363 match, and so only a selection button 1801, which corresponds to the paper feed deck 363, is displayed in a selectable manner.

As described above, according to the second embodiment, when RIP images are used for reference image registration, inspection does not always fail even if printing is performed on a sheet of a different sheet type. Accordingly, it is possible to allow selection of a paper feed deck that stores sheets for which the sheet size matches and only the sheet type is different in place of a paper feeding unit in which sheet outage has occurred during execution of an inspection job.

OTHER EMBODIMENTS

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-004706, filed Jan. 16, 2023, which is hereby incorporated by reference herein in its entirety.

What is claimed is:

1. A print system comprising:
a plurality of paper feeding units;
a display; and
one or more controllers including one or more processors and one or more memories, the one or more controllers configured to:
print an image on a sheet according to a print job;
store a reference image in a storage;
generate a scanned image by reading a printed sheet;
inspect an image on the printed sheet based on the generated scanned image and the stored reference image;
detect sheet outage in a paper feeding unit that is a feed source for the print job; and
in a case that the print job is accompanied by inspection, the sheet outage is detected in the paper feeding unit that is the feed source, and the reference image is generated by using print data of the print job, display a screen, on the display, for enabling selection of a paper feeding unit of the plurality of paper feeding units that stores sheets whose size matches a sheet size set for the paper feeding unit that is the feed source, regardless of whether a type of the sheets matches a sheet type set for the paper feeding unit that is the feed source.

2. The print system according to claim 1, wherein the one or more controllers are further configured to:
in a case the print job is accompanied by inspection, the sheet outage is detected in the paper feeding unit that is the feed source and the reference image has been obtained by reading an image of a sheet on which the image has been printed, display a screen, on the display, for disenabling selection of a paper feeding unit of the plurality of paper feeding units that stores sheets whose size and type do not match a sheet size and sheet type set for the paper feeding unit that is the feed source.

3. The print system according to claim 2, wherein the storage stores a plurality of reference images, and
the plurality of reference images are a plurality of scanned images that have been obtained by reading images of a plurality of sheets on which one copy of the print job has been printed.

4. The print system according to claim 3, wherein the storage stores identification information of a group of the plurality of reference images, and in the inspection, the one or more controllers respectively associate scanned images of a plurality of printed sheets printed by the print job and the reference images based on the identification information and an order of the plurality of printed sheets and inspect images on the plurality of printed sheets.

5. The print system according to claim 1, wherein
the screen includes a plurality of buttons that correspond to the plurality of paper feeding units and are for selecting corresponding paper feeding unit; and
the one or more controllers perform display, on the screen, so as to allow selection of a button that corresponds to a paper feeding unit that stores sheets whose size matches a sheet size set for the paper feeding unit that is the feed source.

6. The print system according to claim 2,
wherein, the screen includes a plurality of buttons that correspond to the plurality of paper feeding units and are for selecting a corresponding paper feeding unit, and the one or more controllers are configured to display the screen so as not to allow selection of a button corresponding to a paper feeding unit that stores sheets whose size and type do not match a sheet size and a sheet type set for the paper feeding unit that is the feed source.

7. A print system comprising:
a plurality of paper feeding units;
a display; and
one or more controllers including one or more processors and one or more memories, the one or more controllers configured to:
print an image on a sheet according to a print job;
store a reference image in a storage;
generate a scanned image by reading a printed sheet;
inspect the printed sheet based on the generated scanned image and the reference image stored in the storage;
detect sheet outage in a paper feeding unit that is a feed source for the print job; and
display a screen on the display for selecting a paper feeding unit that is different from the paper feeding unit in which the sheet outage has been detected; and
in a case that the print job is accompanied by inspection, the sheet outage is detected in the paper feeding unit that is the feed source, and the reference image is generated by using print data of the print job, give a warning in a case where a paper feeding unit that stores sheets whose size does not match a sheet size set for the paper feeding unit that is the feed source, regardless of whether a type of the sheets matches a sheet type set for the paper feeding unit that is the feed source, is selected.

8. The print system according to claim 7,
wherein, in a case that the reference image is a scanned image that has been obtained by reading an image of a sheet on which the image has been printed, at the time of the warning, the one or more controllers are configured to give a warning in a case where a paper feeding unit that stores sheets whose size and type do not match a sheet size and a sheet type set for the paper feeding unit that is the feed source is selected.

9. The print system according to claim 8,
wherein the screen includes a plurality of buttons that correspond to the plurality of paper feeding units and are for selecting a paper feeding unit, and the one or more controllers are configured to give the warning in a case where a paper feeding unit that stores sheets whose size and type do not match a sheet size and a sheet type set for the paper feeding unit that is the feed source is selected.

10. The print system according to claim 7,
wherein the screen includes a plurality of buttons that correspond to the plurality of paper feeding units and are for selecting a paper feeding unit, and, the one or more controllers are configured to give the warning in a case that a button that corresponds to a paper feeding unit that stores sheets whose size does not match a sheet size set for the paper feeding unit that is the feed source is selected.

11. A printing apparatus comprising:
a plurality of paper feeding units; and
one or more controllers including one or more processors and one or more memories, the one or more controllers configured to:
print an image on a sheet according to a print job;
detect sheet outage in a paper feeding unit that is a feed source of the sheet; and
in a case that the print job is accompanied by inspection, the sheet outage is detected in the paper feeding unit that is the feed source, and a reference image to be used in the inspection is generated by using print data of the print job, perform control so as not to allow selection of a paper feeding unit that stores sheets whose size does not match a sheet size set for the paper feeding unit that is the feed source, regardless of whether a type of the sheets matches a sheet type set for the paper feeding unit that is the feed source.

12. The printing apparatus according to claim 11, wherein in the control, the one or more controllers are configured to:
display a screen, on a display, that includes a plurality of buttons that correspond to the plurality of paper feeding units and are for selecting a paper feeding unit; and
perform display, on the screen, so as not to allow selection of a button that corresponds to a paper feeding unit that stores sheets whose size does not match the sheet size set for the paper feeding unit that is the feed source.

13. The printing apparatus according to claim 11,
wherein, in a case that a reference image to be used in the inspection is a scanned image that has been obtained by reading an image of a sheet on which the image has been printed, in the control, the one or more controllers are further configured to perform control so as not to allow selection of a paper feeding unit that stores sheets whose size and type do not match a sheet size and a type of sheet set for the paper feeding unit that is the feed source.

14. The printing apparatus according to claim 13, wherein, in the control, the one or more controllers are further configured to:
display a screen, on a display, that includes a plurality of buttons that correspond to the plurality of paper feeding units and are for selecting a paper feeding unit; and
perform display, on the screen, so as not to allow selection of a button corresponding to a paper feeding unit that stores sheets whose size and type do not match a sheet size and a sheet type set for the paper feeding unit that is the feed source.

15. A printing apparatus comprising:
a plurality of paper feeding units; and
one or more controllers including one or more processors and one or more memories, the one or more controllers configured to:
print an image on a sheet according to a print job;
detect sheet outage in a paper feeding unit that is a feed source of the sheet;
in a case that the sheet outage is detected, display a screen on a display for selecting a paper feeding unit that is different from the paper feeding unit; and
in a case where the print job is accompanied by inspection, the sheet outage is detected in the paper feeding unit that is the feed source, and a reference image to be used in the inspection is generated by using print data of the print job, give a warning in a case where a paper feeding unit that stores sheets whose size does not match a sheet size set for the paper feeding unit that is the feed source, regardless of whether a type of the sheets matches a sheet type set for the paper feeding unit that is the feed source, is selected.

16. A method of controlling a printing apparatus having a plurality of paper for selecting a printing unit configured to print an image on a sheet according to a print job, the method comprising:
detecting sheet outage in a paper feeding unit that is a feed source for the print job; and
in a case that the sheet outage is detected in the detecting, controlling so as to allow selection of a paper feeding unit that is different from the paper feeding unit that is the feed source,
wherein, in the controlling, in a case that the print job is accompanied by inspection, the sheet outage is detected in the detecting in the paper feeding unit that is the feed source, and a reference image to be used in the inspection is generated by using print data of the print job, control is performed so as not to allow selection of a paper feeding unit that stores sheet whose size does not match a sheet size set for the paper feeding unit that is the feed source, regardless of whether a type of the sheets matches a sheet type set for the paper feeding unit that is the feed source.

17. A non-transitory computer-readable storage medium storing a program for causing a processor to execute a method of controlling a printing apparatus having a plurality of paper feeding units and a printing unit configured to print an image on a sheet according to a print job, the method comprising:
detecting sheet outage in a paper feeding unit that is a feed source for the print job; and in a case that the sheet outage is detected in the detecting, controlling so as to allow selection of a paper feeding unit that is different from the paper feeding unit that is the feed source, wherein, in the controlling, in a case that the print job is accompanied by inspection, the sheet outage is detected in the detecting in the paper feeding unit that is the feed source, and a reference image to be used in the inspection is generated by using print data of the print job, control is performed so as not to allow selection of a paper feeding unit that stores sheet whose size does not match a sheet size set for the paper feeding unit that is the feed source, regardless of whether a type of the sheets matches a sheet type set for the paper feeding unit that is the feed source.

* * * * *